US012802880B2

(12) United States Patent
Usui et al.

(10) Patent No.: US 12,802,880 B2
(45) Date of Patent: Nov. 17, 2026

(54) MULTILAYER CERAMIC ELECTRONIC COMPONENT INCLUDING DUMMY ELECTRODE WITH VARYING LINE COVERAGE

(71) Applicant: Murata Manufacturing Co., Ltd., Nagaokakyo (JP)

(72) Inventors: Kazunori Usui, Nagaokakyo (JP); Takashi Sawada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 139 days.

(21) Appl. No.: 18/932,732

(22) Filed: Oct. 31, 2024

(65) Prior Publication Data

US 2025/0054694 A1 Feb. 13, 2025

Related U.S. Application Data

(63) Continuation of application No. PCT/JP2023/016530, filed on Apr. 26, 2023.

(30) Foreign Application Priority Data

Jul. 22, 2022 (JP) ................................ 2022-117486

(51) Int. Cl.

| | |
|---|---|
| ***H01G 4/012*** | (2006.01) |
| ***H01G 4/232*** | (2006.01) |
| ***H01G 4/30*** | (2006.01) |

(52) U.S. Cl.

CPC ............ *H01G 4/012* (2013.01); *H01G 4/232* (2013.01); *H01G 4/30* (2013.01)

(58) Field of Classification Search

None

See application file for complete search history.

(56) References Cited

U.S. PATENT DOCUMENTS

2006/0043523 A1 3/2006 Ito et al.
2012/0188684 A1* 7/2012 Akazawa .............. H01G 4/012 361/321.2

(Continued)

FOREIGN PATENT DOCUMENTS

JP 2006073623 A 3/2006
JP 2012186251 A 9/2012

(Continued)

OTHER PUBLICATIONS

International Search Report in PCT/JP2023/016530, mailed Jul. 25, 2023, 2 pages.

(Continued)

*Primary Examiner* — Eric W Thomas
(74) *Attorney, Agent, or Firm* — Keating & Bennett, LLP

(57) ABSTRACT

A multilayer ceramic electronic component includes a multilayer body including laminated ceramic layers and internal electrode layers. The internal electrode layers include a first internal electrode layer laminated alternately with the ceramic layers and exposed at a first and second end and a second internal electrode layer laminated alternately with the ceramic layers and exposed at a first and second side surface, the multilayer ceramic electronic component further includes a dummy electrode spaced apart from the first and second internal electrode layers and exposed at one of the first and second end surfaces and the first and second side surfaces. A line coverage of a conductive component is smaller than about 50% in a region separated from an exposed portion of the dummy electrode toward a center of the multilayer body by about 50% or more.

14 Claims, 11 Drawing Sheets

(56) References Cited

U.S. PATENT DOCUMENTS

| | | | | |
|---|---|---|---|---|
| 2013/0033154 | A1* | 2/2013 | Sakuratani | H01G 4/30<br>310/366 |
| 2013/0155574 | A1* | 6/2013 | Park | H01G 4/232<br>361/321.3 |
| 2014/0133063 | A1* | 5/2014 | Sakuratani | H01G 4/005<br>361/301.4 |
| 2018/0350521 | A1 | 12/2018 | Oh et al. | |
| 2021/0035736 | A1 | 2/2021 | Cha et al. | |
| 2022/0068561 | A1 | 3/2022 | Sasaki | |

FOREIGN PATENT DOCUMENTS

| | | | |
|---|---|---|---|
| JP | 2014183241 | A | 9/2014 |
| JP | 2018163934 | A | 10/2018 |
| JP | 2018207091 | A | 12/2018 |
| JP | 2021022723 | A | 2/2021 |
| JP | 2022039808 | A | 3/2022 |

OTHER PUBLICATIONS

Written Opinion in PCT/JP2023/016530, mailed Jul. 25, 2023, 3 pages.

* cited by examiner

IV-IV SECTIONAL VIEW

V-V SECTIONAL VIEW

16 {16a, 16b}
30 {30a, 30b, 30c, 30d}
32 {32a, 32b, 32c, 32d}
34 {34a, 34b, 34c, 34d}

MULTILAYER CERAMIC ELECTRONIC COMPONENT INCLUDING DUMMY ELECTRODE WITH VARYING LINE COVERAGE

CROSS REFERENCE TO RELATED APPLICATIONS

This application is a Continuation application of PCT Application No. PCT/JP2023/016530, filed on Apr. 26, 2023, and claims the benefit of priority to Japanese Patent Application No. 2022-117486, filed on Jul. 22, 2022. The entire contents of each application are hereby incorporated herein by reference.

BACKGROUND OF THE INVENTION

1. Field of the Invention

The present invention relates to multilayer ceramic electronic components.

2. Description of the Related Art

In recent years, size reduction of a multilayer ceramic electronic component has been required with increase in performance of a cellular phone such as a smartphone. For example, a multilayer ceramic capacitor is a multilayer ceramic electronic component formed by laminating alternately internal electrode layers and ceramic layers and having a desired electrostatic capacitance that is achieved depending on the number of the laminated layers or the thickness of the ceramic layer.

Japanese Unexamined Patent Application Publication No. 2006-73623 discloses a multilayer ceramic capacitor including an element body (multilayer body) in which dielectric layers (ceramic layers) and internal electrode layers are laminated alternatively.

However, in the structure of the multilayer ceramic capacitor described in Japanese Unexamined Patent Application Publication No. 2006-73623, the planar area of the internal electrode layer is smaller than the planar area of the ceramic layer, and there is a level difference between a peripheral portion of the internal electrode layer, except an extended portion thereof to an end surface of the above-described element body, and the ceramic layer. The internal electrode layer is bent by being affected by the level difference, and there arises a problem that a short circuit between the internal electrode layers and reduction in high-temperature load reliability are likely to occur. In particular, as the thickness of the dielectric layer (ceramic layer) is decreased and as the number of the laminated layers of the internal electrode layers and the dielectric layers (ceramic layers) is increased, a short circuit between the internal electrode layers is more likely to occur, and the reliability tends to be reduced.

Thus, to solve the above problem, there has been known a way in which a dummy electrode having a thickness equivalent to the level difference between the peripheral portion of the internal electrode layer, except the extended portion thereof to the end surface of the multilayer body, and the ceramic layer is provided in an outer layer portion.

However, since current also flows into the dummy electrode, there arises a problem that a current path is lengthened to cause increase in ESR and ESL. In addition, the fixing strength between the ceramic layer and the dummy electrode is reduced by providing the dummy electrode, which may lead to peeling between the ceramic layers.

SUMMARY OF THE INVENTION

Example embodiments of the present invention provide multilayer ceramic electronic components that each prevent peeling between ceramic layers.

A multilayer ceramic electronic component according to an example embodiment of the present invention includes a multilayer body including multiple ceramic layers that are laminated and multiple internal electrode layers that are laminated, a first main surface and a second main surface that oppose each other in a lamination direction, a first side surface and a second side surface that oppose each other in a width direction orthogonal or substantially orthogonal to the lamination direction, and a first end surface and a second end surface that oppose each other in a length direction orthogonal or substantially orthogonal to the lamination direction and to the width direction, and multiple outer electrodes, in which the multiple internal electrode layers include a first internal electrode layer laminated alternately with the multiple ceramic layers and exposed at the first end surface and the second end surface and a second internal electrode layer laminated alternately with the multiple ceramic layers and exposed at the first side surface and the second side surface, the multilayer ceramic electronic component further includes a dummy electrode spaced apart from the first internal electrode layer and the second internal electrode layer and exposed at one of the first end surface, the second end surface, the first side surface, and the second side surface, the multiple outer electrodes include a first outer electrode and a second outer electrode that are connected to the first internal electrode layer and a third outer electrode and a fourth outer electrode that are connected to the second internal electrode layer, and, in the dummy electrode, a line coverage of a conductive component is smaller than about 50% in a region separated from an exposed portion of the dummy electrode toward a center of the multilayer body by about 50% or more.

With a multilayer ceramic electronic component according to an example embodiment of the present invention, in the dummy electrode, the line coverage of the conductive component is smaller than about 50% in the region separated from the exposed portion of the dummy electrode toward the center of the multilayer body by about 50% or more, and the ceramic layers can thereby be bonded to each other with a pore interposed therebetween, which leads to the improvement of the bonding strength between the ceramic layers and the improvement of moisture resistance reliability. In addition, due to the pore, current hardly flows to a distal end of the dummy electrode, and a current path can thereby be shortened, which also leads to reduction in ESL.

According to example embodiments of the present invention, there can be provided such a multilayer ceramic electronic component that can prevent peeling between the ceramic layers.

The above and other elements, features, steps, characteristics and advantages of the present invention will become more apparent from the following detailed description of the example embodiments with reference to the attached drawings.

BRIEF DESCRIPTION OF THE DRAWINGS

FIG. 14A illustrates printing patterns used when a multilayer ceramic capacitor including dummy electrodes exposed at a first side surface, a second side surface, a first end surface, and a second end surface is produced, FIG. 14B illustrates printing patterns used when a multilayer ceramic capacitor including dummy electrodes exposed at the first side surface and the second side surface is produced, and FIG. 14C illustrates printing patterns used when a multilayer ceramic capacitor including dummy electrodes exposed at the first end surface and the second end surface is produced.

DETAILED DESCRIPTION OF THE EXAMPLE EMBODIMENTS

1. Multilayer Ceramic Electronic Component

Figure 1:
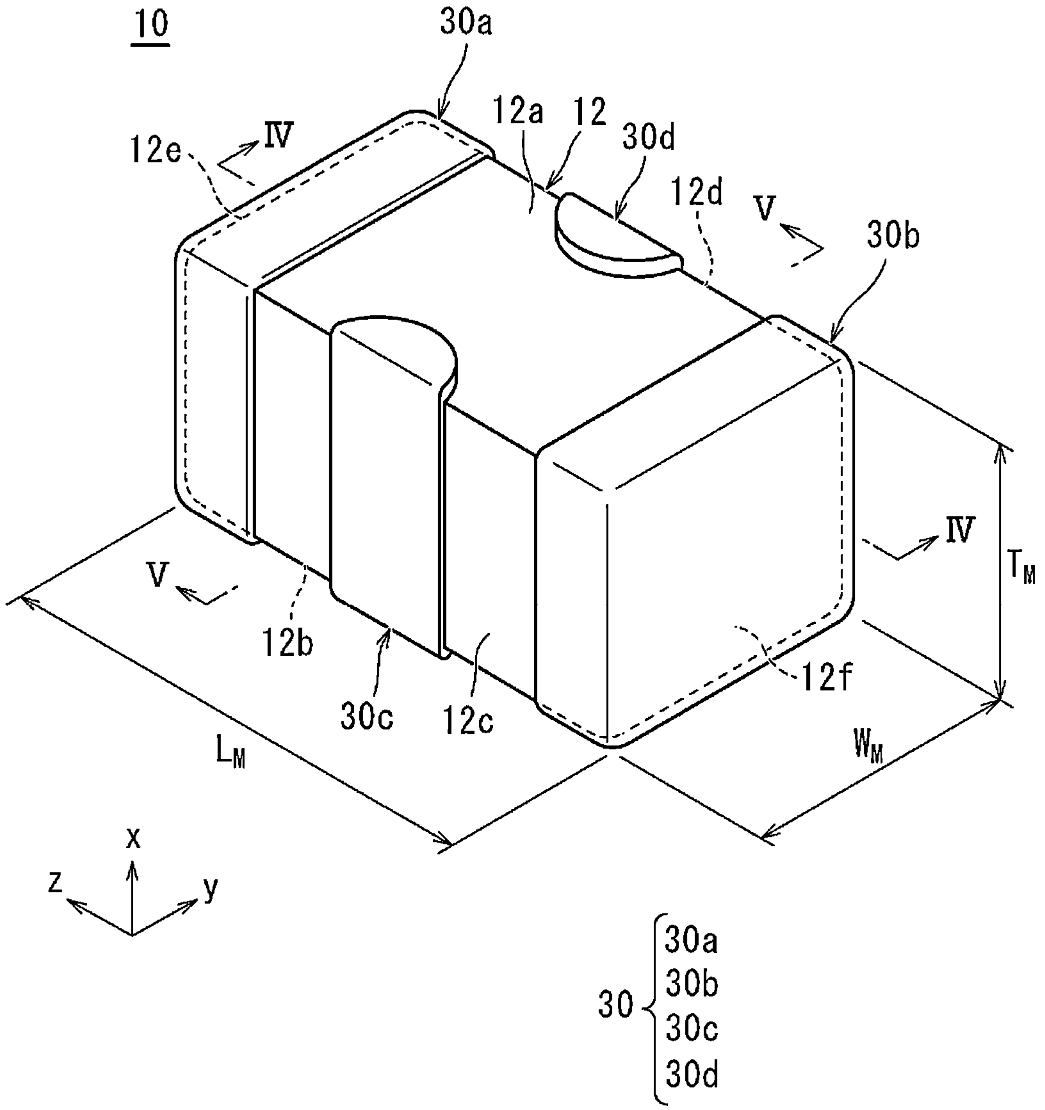
FIG. 1 is an external perspective view of a multilayer ceramic capacitor that is one example embodiment of a multilayer ceramic electronic component according to the present invention.
Figure 2:
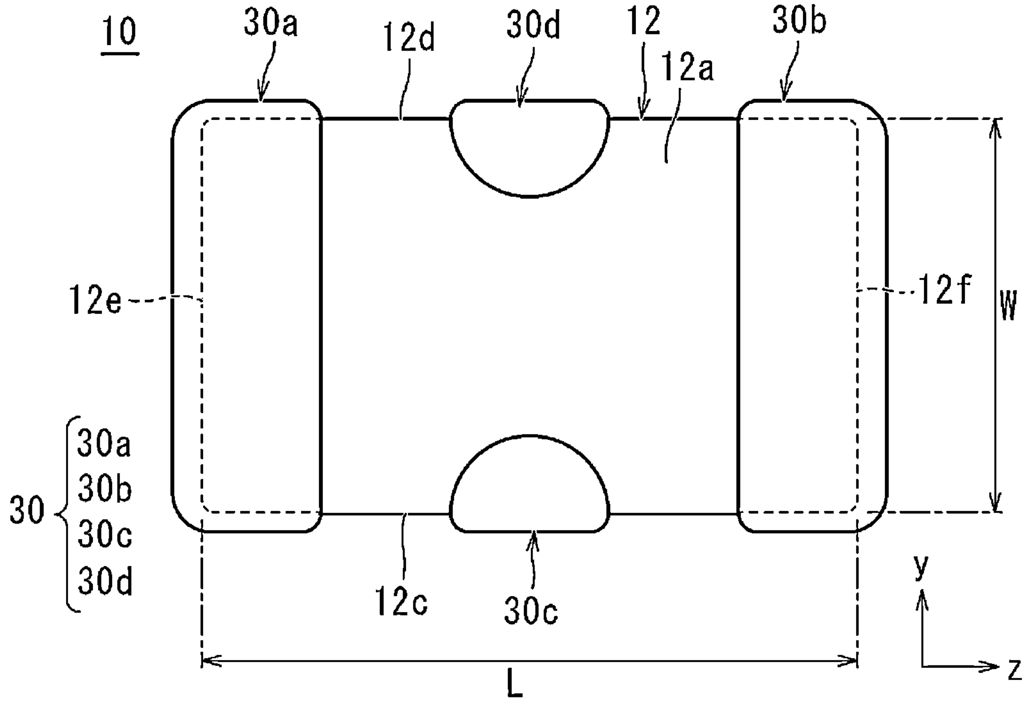
FIG. 2 is a top view of the multilayer ceramic capacitor that is an example embodiment of the multilayer ceramic electronic component according to the present invention.
Figure 3:
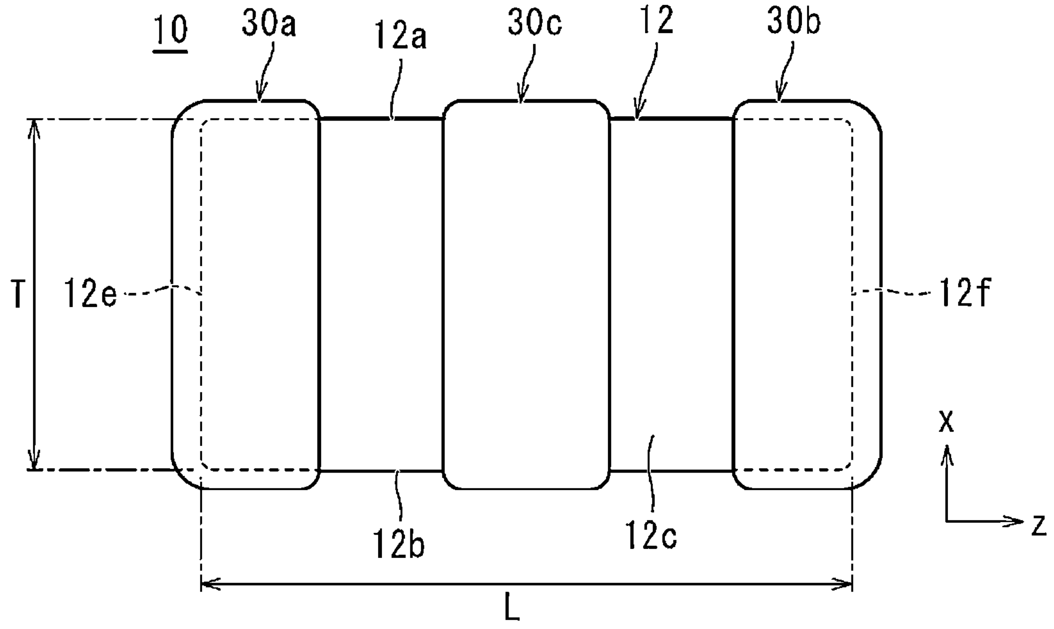
FIG. 3 is a front view of the multilayer ceramic capacitor that is an example embodiment of the multilayer ceramic electronic component according to the present invention.
Figure 4:
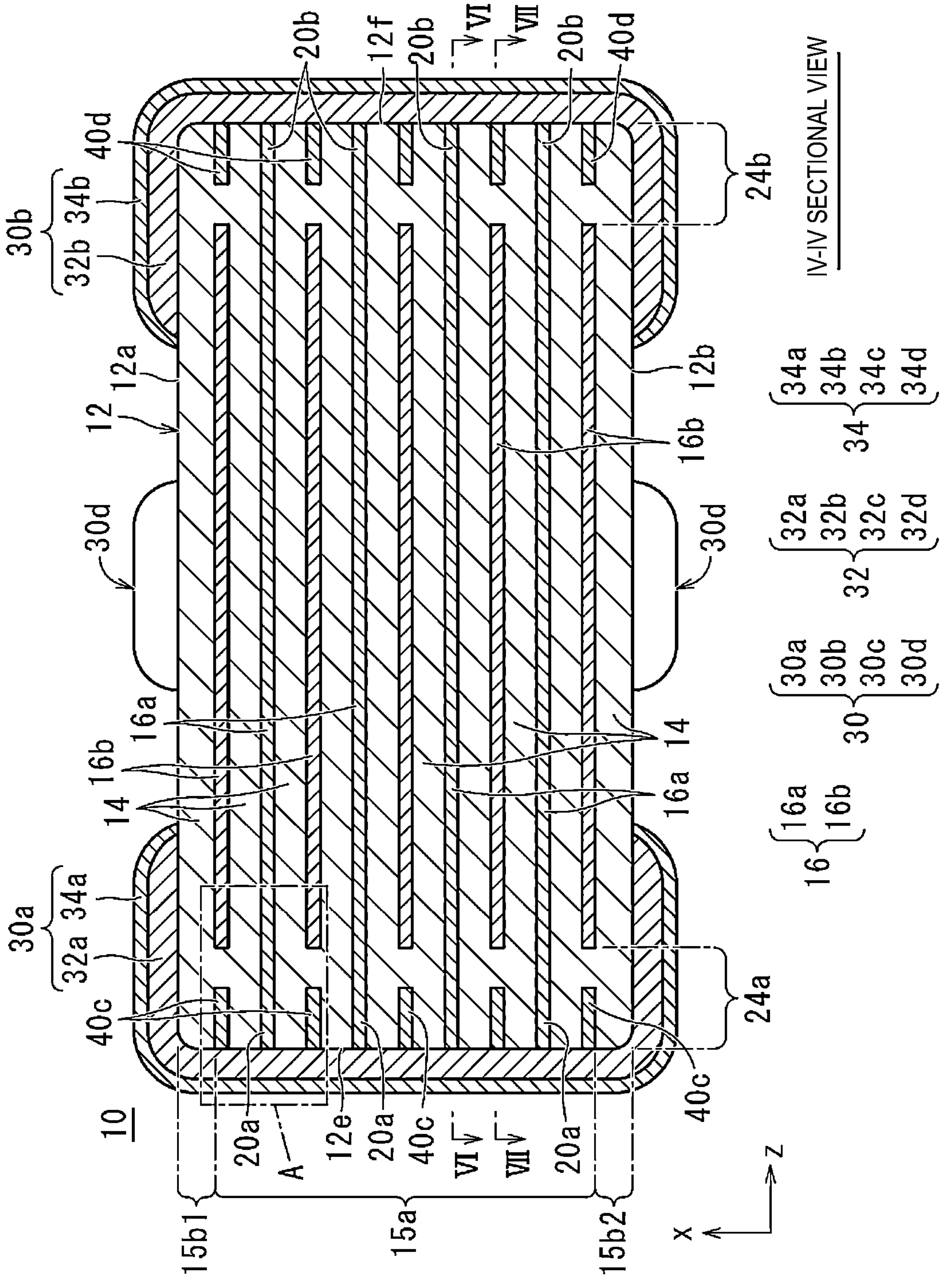
FIG. 4 is a sectional view taken along line IV-IV according to FIG. 1.
Figure 5:
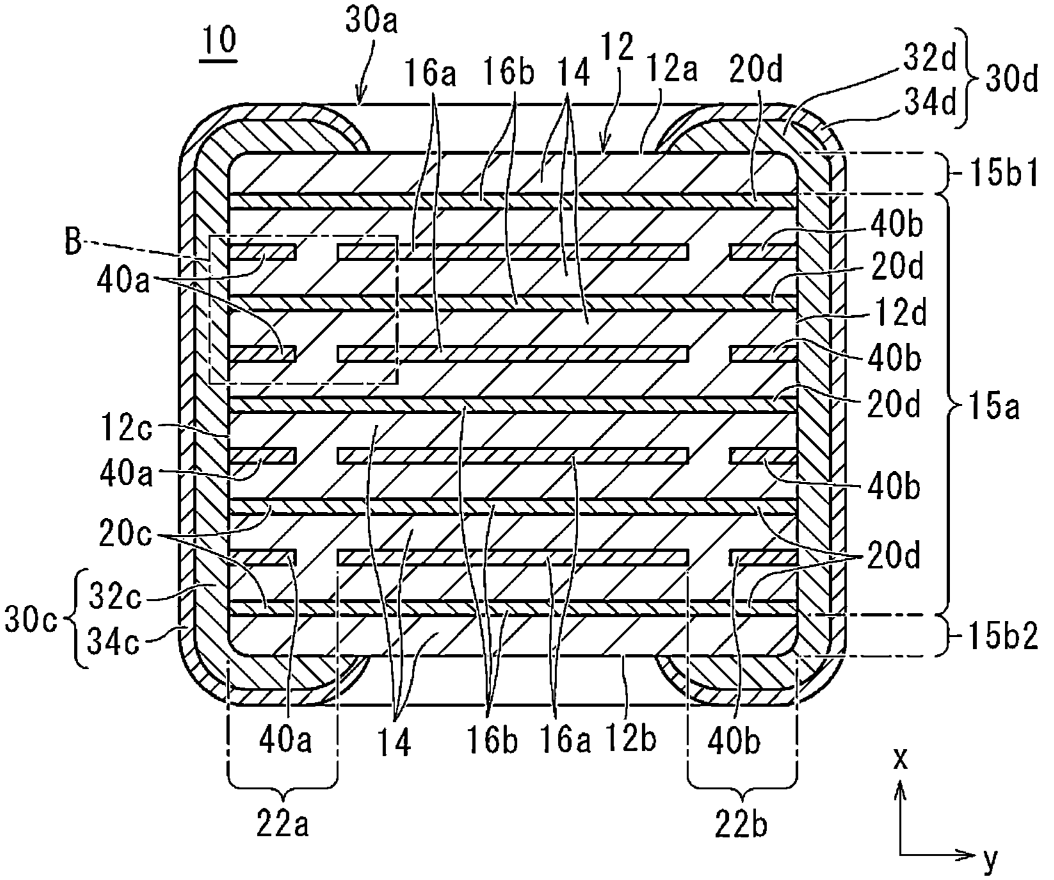
FIG. 5 is a sectional view taken along line V-V according to FIG. 1.
Figure 6:
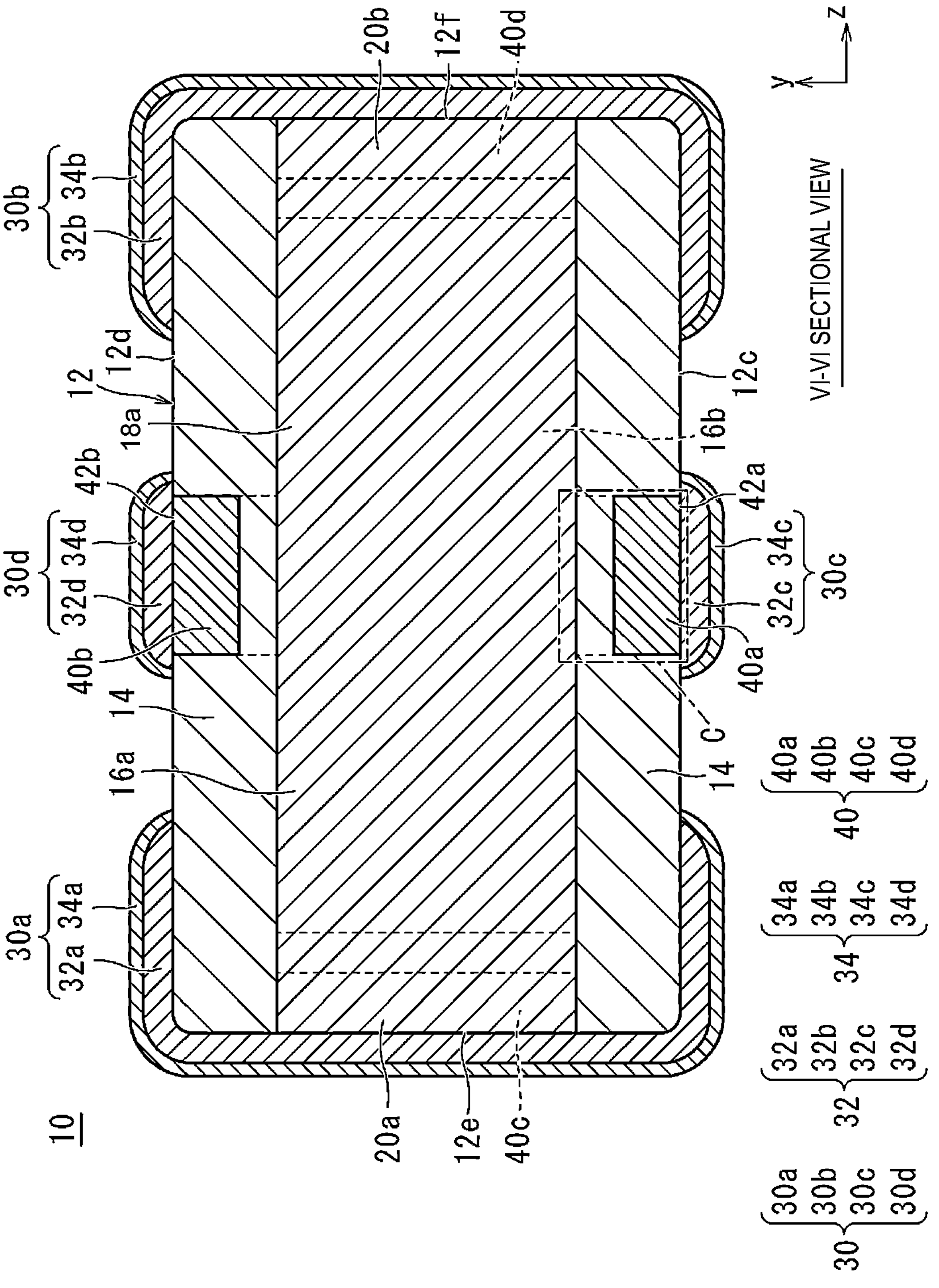
FIG. 6 is a sectional view taken along line VI-VI according to FIG. 4.
Figure 7:
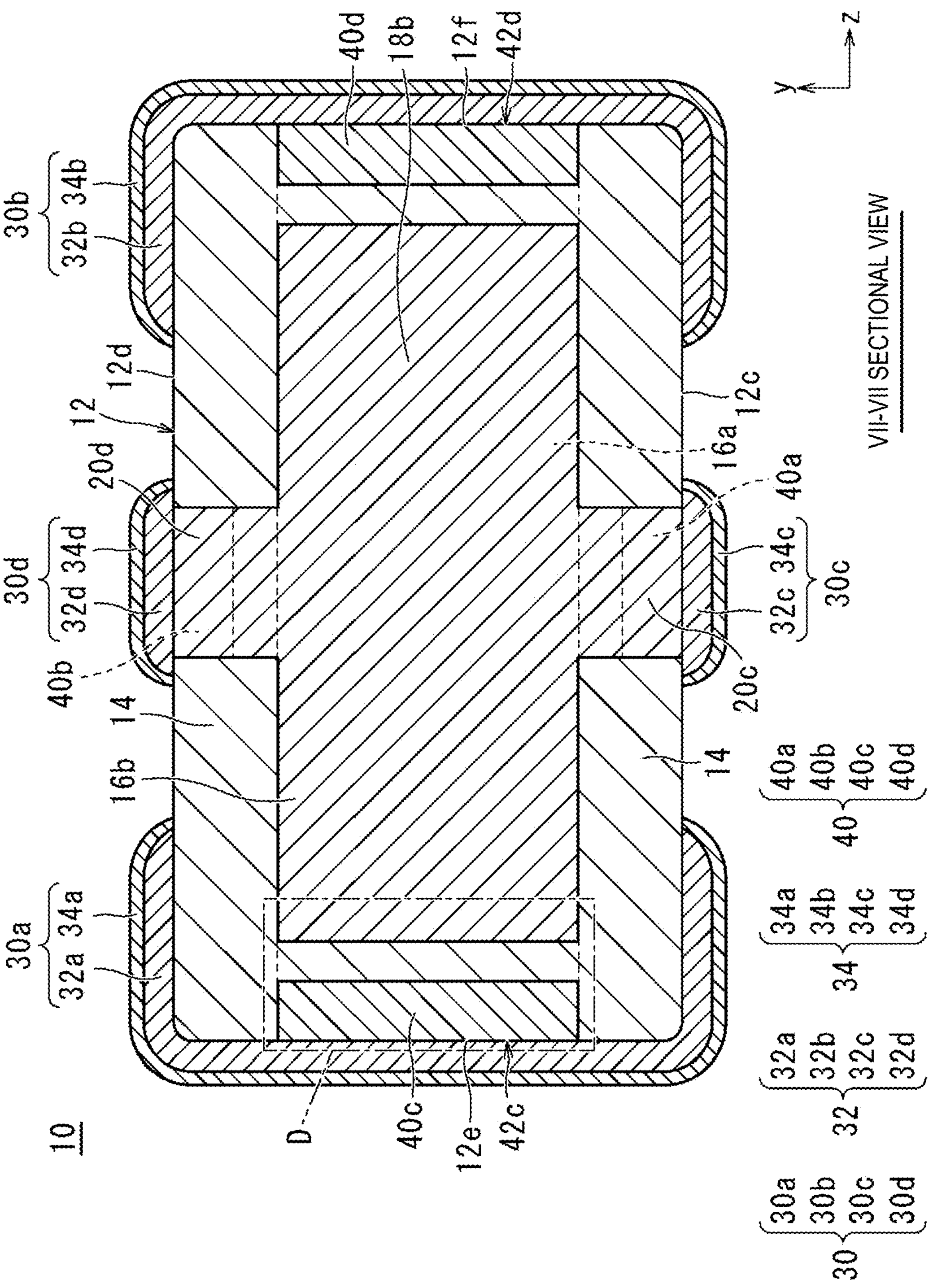
FIG. 7 is a sectional view taken along line VII-VII according to FIG. 4.
Figure 8A:
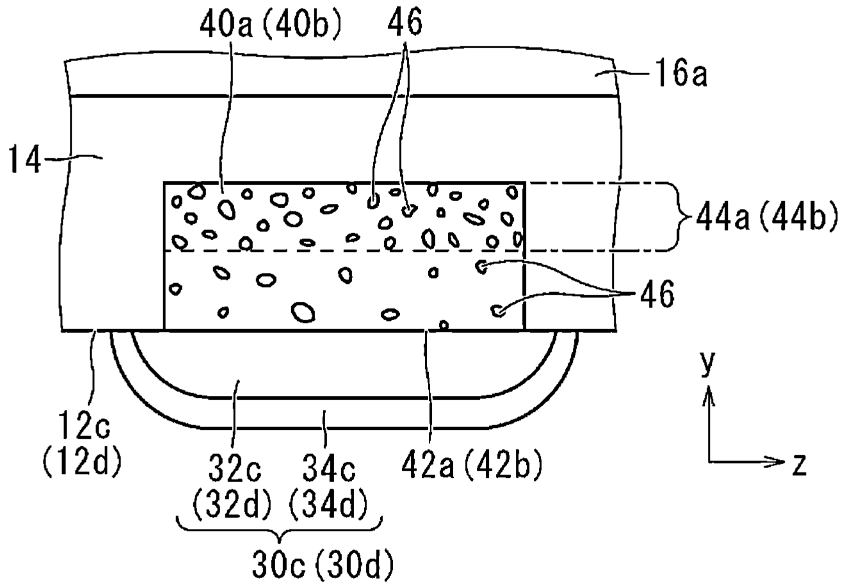
In FIG. 8A is an enlarged view of portion C in FIG. 6 and illustrates the configuration of a dummy electrode closer to a side surface of a multilayer body.
Figure 8B:
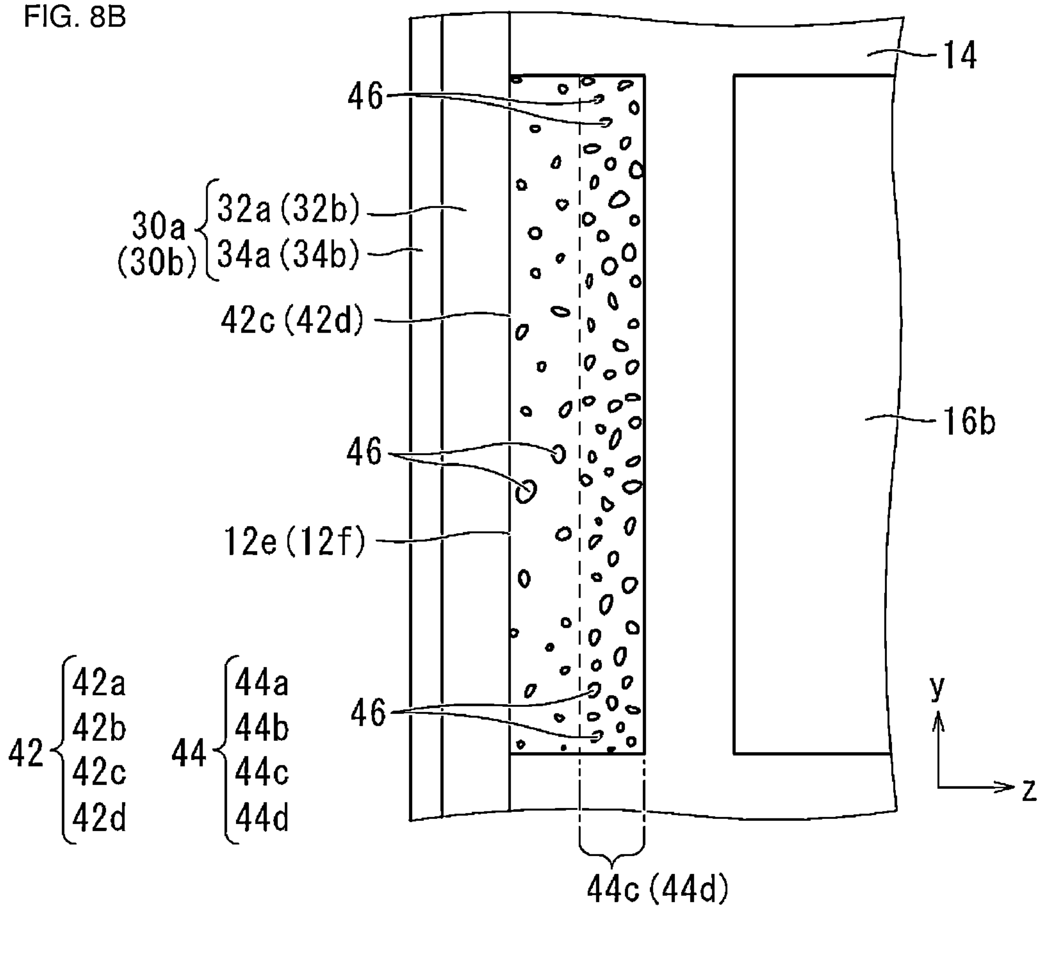
FIG. 8B is an enlarged view of portion D in FIG. 7 and illustrates the configuration of a dummy electrode closer to an end surface of the multilayer body.
Figure 9:
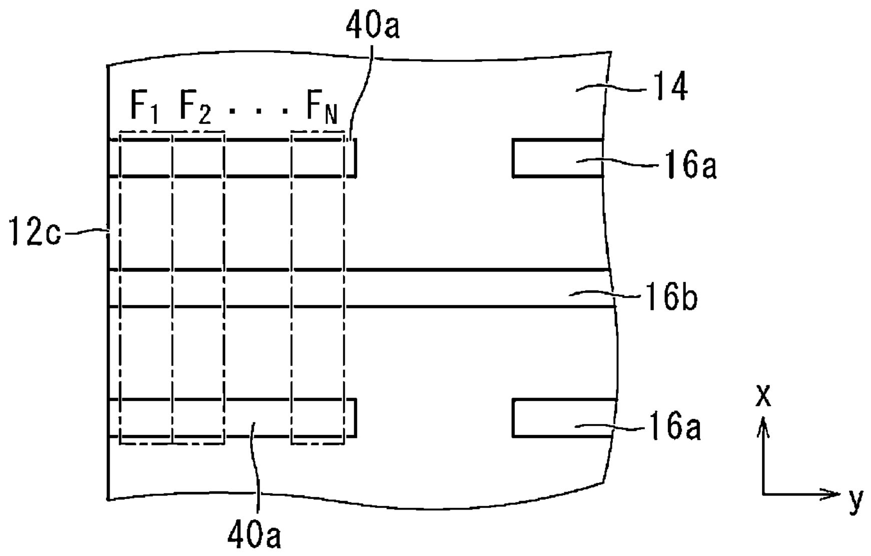
FIG. 9 illustrates a measurement region of a line coverage in the dummy electrode.
Figure 10:
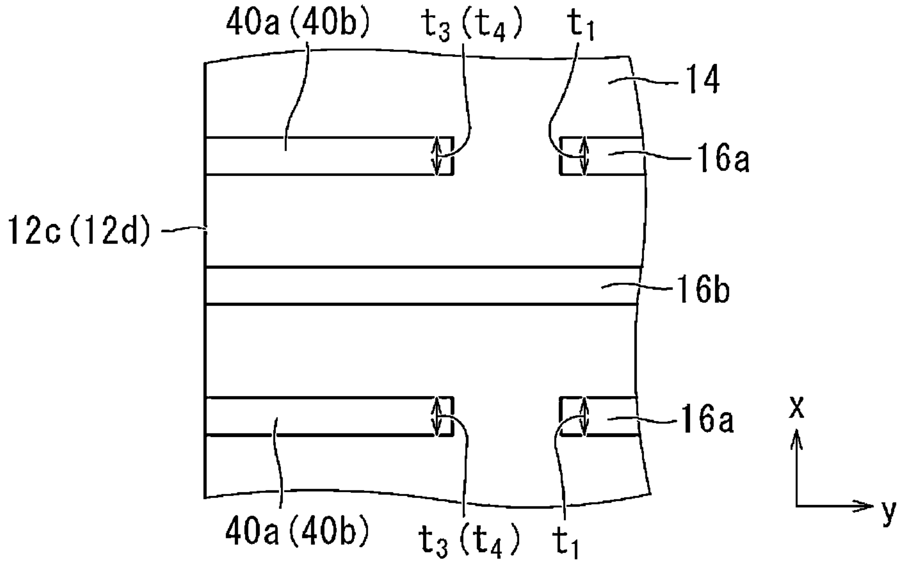
FIG. 10 is an enlarged view of portion A in FIG. 4.
Figure 11:
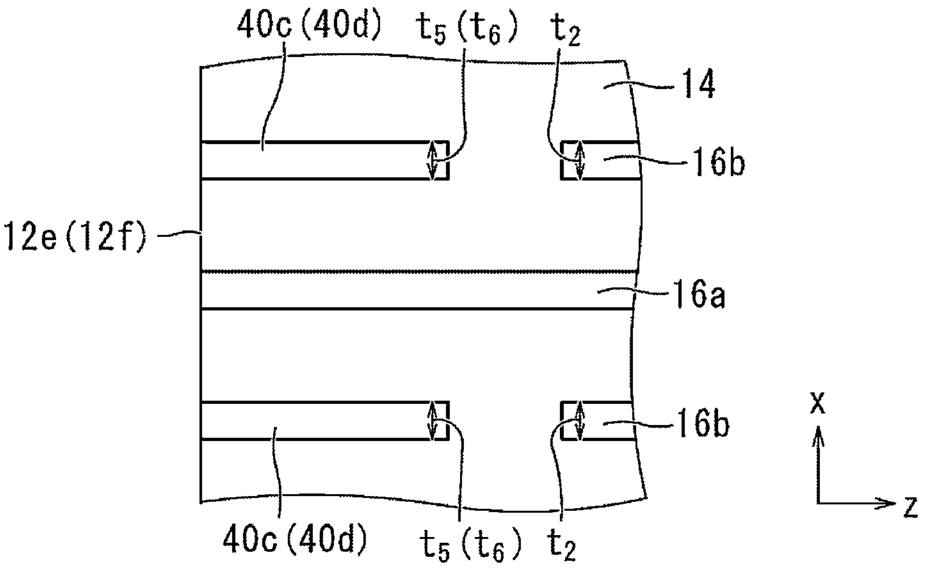
FIG. 11 is an enlarged view of portion B in FIG. 5.
Figure 12:
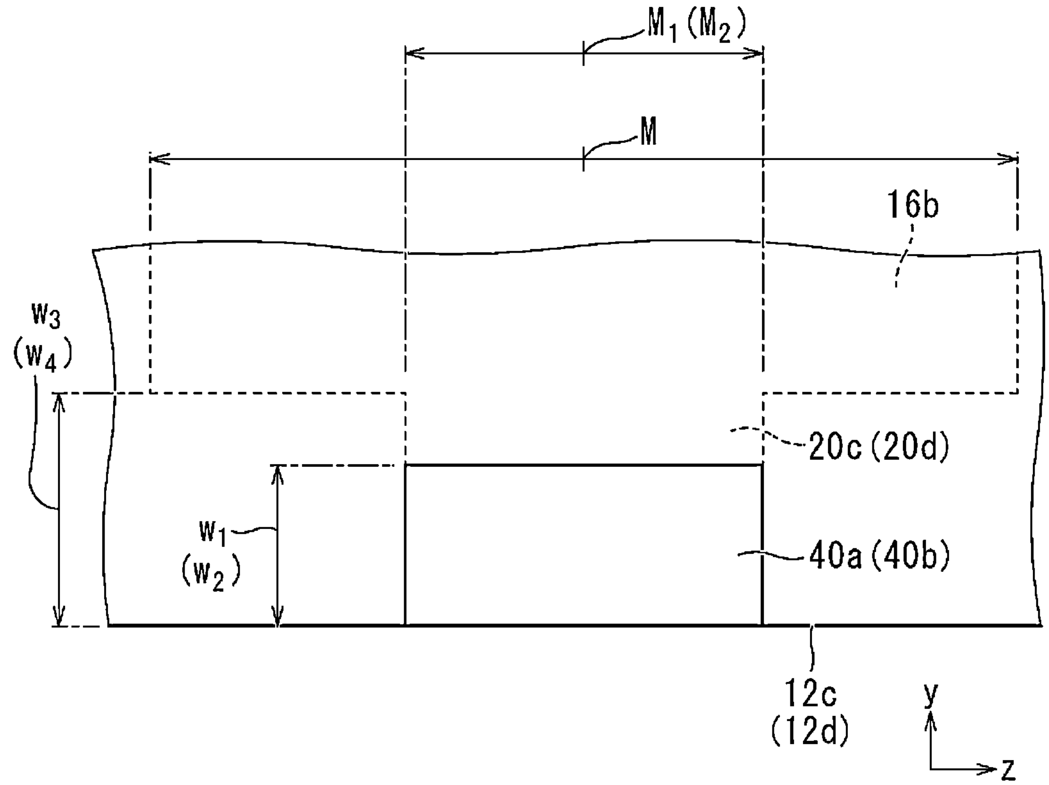
FIG. 12 is an enlarged view of portion C in FIG. 6.
Figure 13:
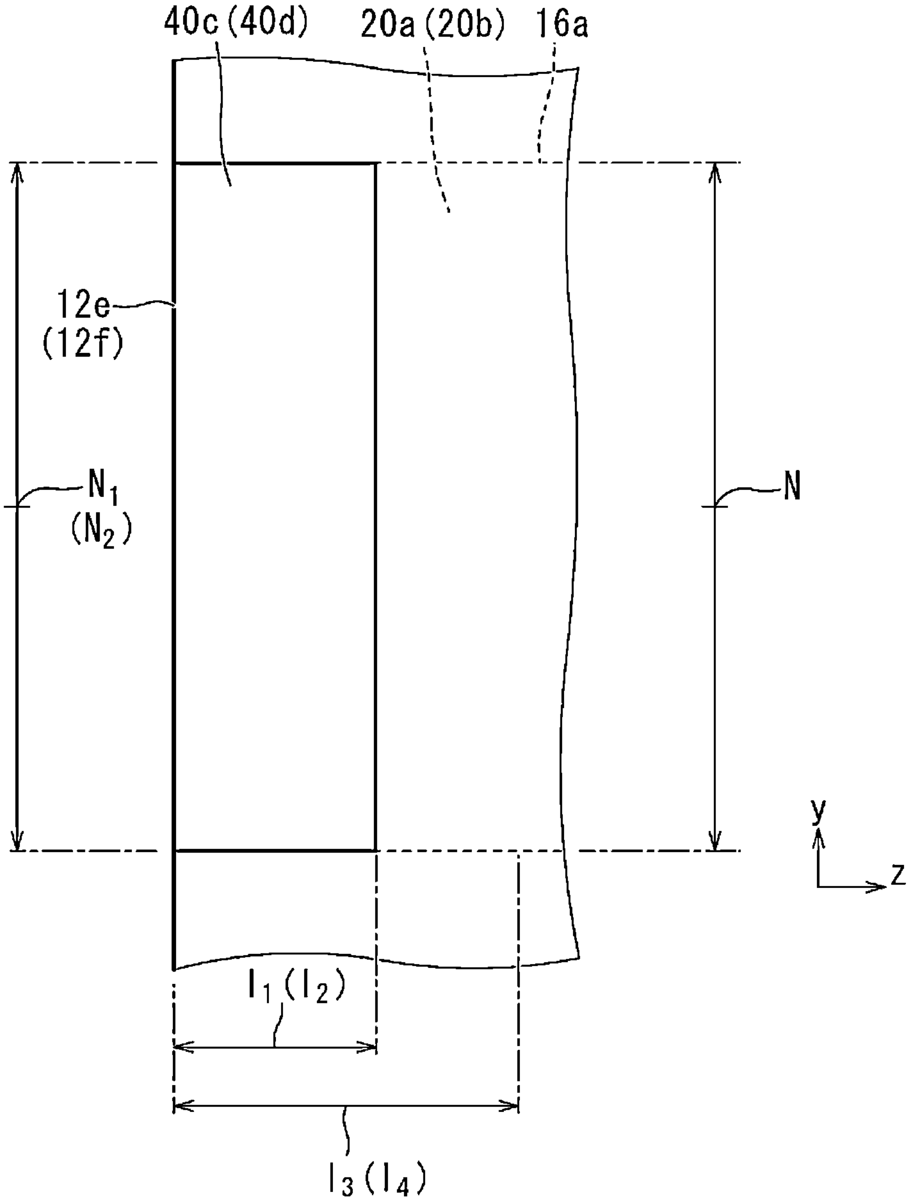
FIG. 13 is an enlarged view of portion D in FIG. 7.
Figure 14A:
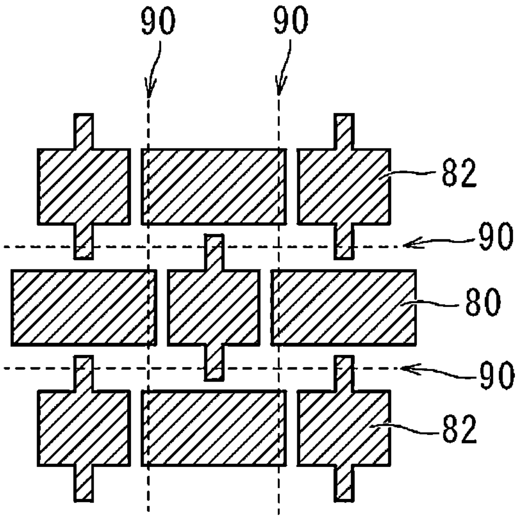
FIGS. 14A to 14C illustrate printing patterns, of internal electrode layers and the dummy electrodes, used in a manufacturing method of the multilayer ceramic capacitor that is an example embodiment of the multilayer ceramic electronic component of the present invention.
Figure 14B:
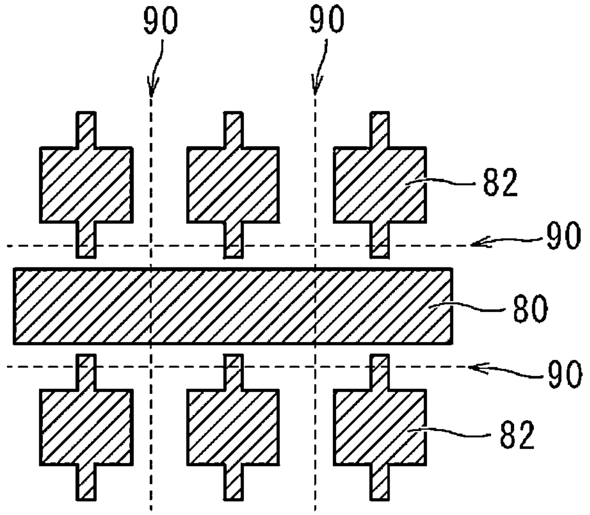
Figure 14C:
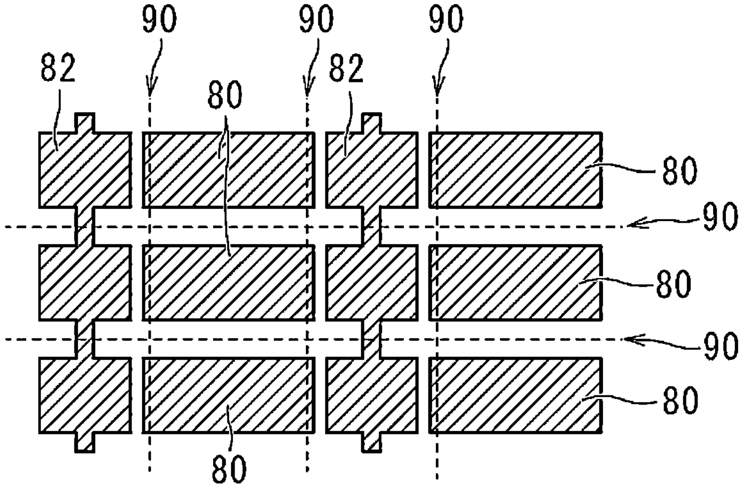

A multilayer ceramic capacitor 10 that is an example embodiment of a multilayer ceramic electronic component according to the present invention will be described. FIG. 1 is an external perspective view of a multilayer ceramic capacitor that is an example embodiment of a multilayer ceramic electronic component according to the present invention. FIG. 2 is a top view of the multilayer ceramic capacitor that is an example of the multilayer ceramic electronic component according to the present invention. FIG. 3 is a front view of the multilayer ceramic capacitor that is an example of the multilayer ceramic electronic component according to the present invention. FIG. 4 is a sectional view taken along line IV-IV according to FIG. 1. FIG. 5 is a sectional view taken along line V-V according to FIG. 1. FIG. 6 is a sectional view taken along line VI-VI according to FIG. 4. FIG. 7 is a sectional view taken along line VII-VII according to FIG. 4. FIG. 8A is an enlarged view of portion C in FIG. 6 and illustrates the configuration of a dummy electrode closer to a side surface of a multilayer body. FIG. 8B is an enlarged view of portion D in FIG. 7 and illustrates the configuration of a dummy electrode closer to an end surface of the multilayer body. FIG. 9 illustrates a measurement region of a line coverage in the dummy electrode. FIG. 10 is an enlarged view of portion A in FIG. 4. FIG. 11 is an enlarged view of portion B in FIG. 5. FIG. 12 is an enlarged view of portion C in FIG. 6. FIG. 13 is an enlarged view of portion D in FIG. 7. FIGS. 14A to 14C illustrate printing patterns, of internal electrode layers and the dummy electrodes, used in a manufacturing method of a multilayer ceramic capacitor that is an example of the multilayer ceramic electronic component of the present invention, FIG. 14A illustrates printing patterns used when a multilayer ceramic capacitor including dummy electrodes exposed at a first side surface, a second side surface, a first end surface, and a second end surface is produced, FIG. 14B illustrates printing patterns used when a multilayer ceramic capacitor including dummy electrodes exposed at the first side surface and the second side surface is produced, and FIG. 14C illustrates printing patterns used when a multilayer ceramic capacitor including dummy electrodes exposed at the first end surface and the second end surface is produced.

The multilayer ceramic capacitor 10 includes a multilayer body 12 including multiple ceramic layers 14 that are laminated and multiple internal electrode layers 16 that are each laminated on a corresponding one of the ceramic layers 14, the multilayer body 12 further including a first main surface 12*a* and a second main surface 12*b* that oppose each other in a lamination direction x, a first side surface 12*c* and a second side surface 12*d* that oppose each other in a width direction y orthogonal or substantially orthogonal to the lamination direction x, and a first end surface 12*e* and a second end surface 12*f* that oppose each other in a length direction z orthogonal or substantially orthogonal to the lamination direction x and to the width direction y; and multiple outer electrodes 30 connected to the internal electrode layers 16.

A dimension, in the length direction z, of the multilayer ceramic capacitor 10 including the multilayer body 12 and the outer electrodes 30 is referred to as an $L_M$ dimension. The $L_M$ dimension is, for example, preferably about 0.4 mm or more and about 1.6 mm or less. A dimension, in the width direction y, of the multilayer ceramic capacitor 10 including the multilayer body 12 and the outer electrodes 30 is referred to as a $W_M$ dimension. The $W_M$ dimension is, for example, preferably about 0.2 mm or more and about 1.0 mm or less. A dimension, in the lamination direction x, of the multilayer ceramic capacitor 10 including the multilayer body 12 and the outer electrodes 30 is referred to as a $T_M$ dimension. The $T_M$ dimension is, for example, preferably about 0.2 mm or more and about 1.0 mm or less.

Multilayer Body

The multilayer body 12 includes the multiple ceramic layers 14 that are laminated and the multiple internal electrode layers 16 that are each laminated on a corresponding one of the ceramic layers 14. The multilayer body 12 further includes the first main surface 12*a* and the second main surface 12*b* that oppose each other in the lamination direction x, the first side surface 12*c* and the second side surface 12*d* that oppose each other in the width direction y orthogonal or substantially orthogonal to the lamination direction x, and the first end surface 12*e* and the second end surface 12*f* that oppose each other in the length direction z orthogonal or substantially orthogonal to the lamination direction x and to the width direction y.

The multilayer body 12 preferably has a rectangular or substantially rectangular parallelepiped shape. In addition, a corner portion and a ridge portion of the multilayer body 12 are preferably rounded. Note that such a corner portion is a portion where three adjacent surfaces of the multilayer body 12 intersect, and such a ridge portion is a portion where two adjacent surfaces of the multilayer body 12 intersect. In addition, a portion or the whole of the first main surface 12*a* and the second main surface 12*b*, the first side surface 12*c* and the second side surface 12*d*, and the first end surface 12*e* and the second end surface 12*f* may be, for example, uneven.

The multilayer body 12 includes, in the lamination direction x connecting the first main surface 12*a* and the second main surface 12*b*, an effective layer portion 15*a* in which the multiple internal electrode layers 16 are located so as to oppose one another with the ceramic layer 14 interposed therebetween, a first outer layer portion 15*b*1 formed by multiple ceramic layers 14 positioned between the first main surface 12*a* and the internal electrode layer 16, of the multiple internal electrode layers 16, positioned closest to the first main surface 12*a*, and a second outer layer portion 15*b*2 formed by multiple ceramic layers 14 positioned between the second main surface 12*b* and the internal electrode layer 16, of the multiple internal electrode layers 16, positioned closest to the second main surface 12*b*.

The first outer layer portion 15*b*1 is closer to the first main surface 12*a* of the multilayer body 12 and is an assembly of the multiple ceramic layers 14 positioned between the first main surface 12*a* and the internal electrode layer 16 closest to the first main surface 12*a*.

The second outer layer portion 15*b*2 is positioned closer to the second main surface 12*b* of the multilayer body 12 and is an assembly of the multiple ceramic layers 14 positioned between the second main surface 12*b* and the internal electrode layer 16 closest to the second main surface 12*b*.

The effective layer portion 15*a* is a region interposed between the first outer layer portion 15*b*1 and the second outer layer portion 15*b*2.

The multilayer body 12 includes side portions (e.g., W gaps) 22*a* and 22*b*. The side portion 22*a* is positioned between each of one ends, in the width direction y, of a first opposing portion 18*a* of a first internal electrode layer 16*a* and a second opposing portion 18*b* of a second internal electrode layer 16*b*, which will be described later, and the first side surface 12*c*. The side portion 22*b* is positioned between each of one ends, in the width direction y, of the first opposing portion 18*a* of the first internal electrode layer 16*a* and the second opposing portion 18*b* of the second internal electrode layer 16*b*, which will be described later, and the second side surface 12*d*. The side portions 22*a* and 22*b* include a third extended portion 20*c* and a fourth extended portion 20*d* of the second internal electrode layer 16*b*.

The multilayer body 12 further includes end portions (e.g., L gaps) 24*a* and 24*b*. The end portion 24*a* is positioned between each of one ends, in the length direction z, of the first opposing portion 18*a* of the first internal electrode layer 16*a* and the second opposing portion 18*b* of the second internal electrode layer 16*b*, which will be described later, and the first end surface 12*e*. The end portion 24*b* is positioned between each of one ends, in the length direction z, of the first opposing portion 18*a* of the first internal electrode layer 16*a* and the second opposing portion 18*b* of the second internal electrode layer 16*b*, which will be described later, and the second end surface 12*f*. The end portions 24*a* and 24*b* include a first extended portion 20*a* and a second extended portion 20*b* of the first internal electrode layer 16*a*.

The ceramic layer 14 can be made of a material such as a dielectric material. Examples of a usable dielectric material include, for example, a dielectric ceramic whose main component is, for example, $BaTiO_3$, $CaTiO_3$, $SrTiO_3$, or $CaZrO_3$. A material in which a sub-component such as a Mn compound, an Fe compound, a Cr compound, a Co compound, or a Ni compound is added to the above main component may also be used.

The number of the laminated ceramic layers 14 is not particularly limited but is, for example, preferably about 4 or more and about 1000 or less including the first outer layer portion 15*b*1 and the second outer layer portion 15*b*2. In addition, the thickness of the ceramic layer 14 is, for example, preferably about 0.4 μm or more and about 1.0 μm or less.

The dimensions of the multilayer body 12 are not particularly limited. A dimension of the multilayer body 12 in the length direction z connecting the first end surface 12*e* and the second end surface 12*f* is referred to as an L dimension. The L dimension is, for example, preferably about 0.4 mm or more and about 1.6 mm or less. A dimension of the multilayer body 12 in the width direction y connecting the first side surface 12*c* and the second side surface 12*d* is referred to as a W dimension. The W dimension is, for example, preferably about 0.2 mm or more and about 1.0 mm or less. A dimension of the multilayer body 12 in the lamination direction x connecting the first main surface 12*a* and the second main surface 12*b* is referred to as a T dimension. The T dimension is, for example, preferably about 0.2 mm or more and about 1.0 mm or less.

Internal Electrode Layer

The internal electrode layers 16 include the first internal electrode layer 16*a* and the second internal electrode layer 16*b*.

The first internal electrode layer 16*a* is provided on a corresponding one of the multiple ceramic layers 14. In addition, the first internal electrode layer 16*a* is extended to the first end surface 12*e* and to the second end surface 12*f*. The first internal electrode layer 16*a* includes the first opposing portion 18*a* positioned in an inner portion of the multilayer body 12, the first extended portion 20*a* connected to the first opposing portion 18*a* and extended to the first end surface 12*e*, and the second extended portion 20*b* connected to the first opposing portion 18*a* and extended to the second end surface 12*f*.

The shape of the first opposing portion 18*a* of the first internal electrode layer 16*a* is not particularly limited but is preferably a rectangle or substantially a rectangle in a plan view. However, in the plan view, a corner portion may be rounded or may be formed diagonally (e.g., have a tapered shape). In addition, the first opposing portion 18*a* may have a tapered shape inclined in any direction in the plan view.

The shapes of the first extended portion 20*a* and the second extended portion 20*b* of the first internal electrode layer 16*a* are not particularly limited but are each preferably a rectangle or substantially a rectangle in the plan view. However, in the plan view, a corner portion may be rounded or may be formed diagonally (e.g., have a tapered shape). In addition, the first extended portion 20*a* and the second extended portion 20*b* may have a tapered shape inclined in any direction in the plan view.

The second internal electrode layer 16*b* is provided on a corresponding one of the multiple ceramic layers 14. In addition, the second internal electrode layer 16*b* is extended to the first side surface 12*c* and to the second side surface 12*d*. The second internal electrode layer 16*b* includes the second opposing portion 18*b* positioned in the inner portion of the multilayer body 12, the third extended portion 20*c* connected to the second opposing portion 18*b* and extended to the first side surface 12*c*, and the fourth extended portion 20*d* connected to the second opposing portion 18*b* and extended to the second side surface 12*d*.

The shape of the second opposing portion 18*b* of the second internal electrode layer 16*b* is not particularly limited but is preferably a rectangle or substantially a rectangle in a plan view. However, in the plan view, a corner portion may be rounded or may be formed diagonally (e.g., have a tapered shape). In addition, the second opposing portion 18*b* may have a tapered shape inclined in any direction in the plan view.

The shapes of the third extended portion 20*c* and the fourth extended portion 20*d* of the second internal electrode layer 16*b* are not particularly limited but are each preferably a rectangle or substantially a rectangle in the plan view. However, in the plan view, a corner portion may be rounded or may be formed diagonally (e.g., have a tapered shape). In addition, the third extended portion 20*c* and the fourth extended portion 20*d* may have a tapered shape inclined in any direction in the plan view.

The first internal electrode layer 16*a* and the second internal electrode layer 16*b* can be made of an appropriate conductive material, example of which include metals such as Ni, Cu, Ag, Pd, and Au and an alloy including at least one kind of the metals, such as an Ag—Pd alloy.

In addition, the number of the first internal electrode layers 16*a* is not particularly limited but is preferably, for example, 1 or more and 500 or less. The number of the second internal electrode layers 16*b* is not particularly limited but is preferably, for example, 1 or more and 500 or less. The total number of the first internal electrode layers 16*a* and the second internal electrode layers 16*b* is, for example, preferably 2 or more and 1000 or less.

The thickness of the first internal electrode layer 16*a* is not particularly limited but is preferably, for example, about 0.4 μm or more and about 0.8 μm or less.

In addition, the thickness of the second internal electrode layer 16*b* is not particularly limited but is preferably, for example, about 0.4 μm or more and about 0.8 μm or less.

In the present example embodiment, a capacitance is produced by causing the first opposing portion 18*a* of the first internal electrode layer 16*a* and the second opposing portion 18*b* of the second internal electrode layer 16*b* to oppose each other with the ceramic layer 14 interposed therebetween, and the characteristics of a capacitor are thus exhibited.

When a piezoelectric ceramic is used for the multilayer body 12, the multilayer ceramic electronic component defines functions as a ceramic piezoelectric element. Specific examples of a piezoelectric ceramic material include PZT (lead zirconate titanate)-based ceramic materials.

In addition, when a semiconductor ceramic is used for the multilayer body 12, the multilayer ceramic electronic component defines and functions as a thermistor element. Specific examples of a semiconductor ceramic material include spinel-based ceramic materials.

In addition, when a magnetic ceramic is used for the multilayer body 12, the multilayer ceramic electronic component functions as an inductor element. When the multilayer ceramic electronic component defines and functions as an inductor element, the internal electrode layer is a coil-shaped conductor. Specific examples of a magnetic ceramic material include ferrite ceramic materials.

That is, the multilayer ceramic electronic component according to the present example embodiment can define and function suitably as, in addition to the multilayer ceramic capacitor 10, a ceramic piezoelectric element, a thermistor element, or an inductor element by appropriately changing the material and structure of the multilayer body 12.

Dummy Electrode

A dummy electrode 40 is spaced apart from the first internal electrode layer 16*a* and the second internal electrode layer 16*b* and is exposed at one of the first end surface 12*e*, the second end surface 12*f*, the first side surface 12*c*, and the second side surface 12*d*. When the dummy electrode 40 is exposed at one of the first end surface 12*e*, the second end surface 12*f*, the first side surface 12*c*, and the second side surface 12*d*, a space having a level difference can be filled with the dummy electrode 40 by an amount equivalent to the thickness of each of the first internal electrode layer 16*a* and the second internal electrode layer 16*b*, and it is thus possible to reduce distortion caused during pressing of the internal electrode layer 16 and the ceramic layer 14 and also possible to ensure consolidation.

In the present example embodiment, such dummy electrodes 40 preferably include a first dummy electrode 40*a*, a second dummy electrode 40*b*, a third dummy electrode 40*c*, and a fourth dummy electrode 40*d*.

The first dummy electrode 40*a* spaced apart from the first internal electrode layer 16*a* and exposed at the first side surface 12*c* is provided on the same plane as the ceramic layer 14 on which the first internal electrode layer 16*a* is provided. In addition, the first dummy electrode 40*a* opposes the third extended portion 20*c* of the second internal electrode layer 16*b* with the ceramic layer 14 interposed therebetween.

The shape of the first dummy electrode 40*a* is not particularly limited but is preferably a rectangle or substantially a rectangle in the plan view. However, in the plan view, a corner portion may be rounded or may be formed diagonally (e.g., have a tapered shape). In addition, the first dummy electrode 40*a* may have a tapered shape inclined in any direction in the plan view.

The second dummy electrode 40*b* spaced apart from the first internal electrode layer 16*a* and exposed at the second side surface 12*d* is provided on the same plane as the ceramic layer 14 on which the first internal electrode layer 16*a* is provided. In addition, the second dummy electrode 40*b* opposes the fourth extended portion 20*d* of the second internal electrode layer 16*b* with the ceramic layer 14 interposed therebetween.

The shape of the second dummy electrode 40*b* is not particularly limited but is preferably a rectangle or substantially a rectangle in the plan view. However, in the plan view, a corner portion may be rounded or may be formed diagonally (e.g., have a tapered shape). In addition, the second dummy electrode 40*b* may have a tapered shape inclined in any direction in the plan view.

The third dummy electrode 40*c* spaced apart from the second internal electrode layer 16*b* and exposed at the first end surface 12*e* is provided on the same plane as the ceramic layer 14 on which the second internal electrode layer 16*b* is provided. In addition, the third dummy electrode 40*c* opposes the first extended portion 20*a* of the first internal electrode layer 16*a* with the ceramic layer 14 interposed therebetween.

The shape of the third dummy electrode 40*c* is not particularly limited but is preferably a rectangle or substantially a rectangle in the plan view. However, in the plan view, a corner portion may be rounded or may be formed diagonally (e.g., have a tapered shape). In addition, the third dummy electrode 40*c* may have a tapered shape inclined in any direction in the plan view.

The fourth dummy electrode 40_d_ spaced apart from the second internal electrode layer 16_b_ and exposed at the second end surface 12_f_ is provided on the same plane as the ceramic layer 14 on which the second internal electrode layer 16_b_ is provided. In addition, the fourth dummy electrode 40_d_ opposes the second extended portion 20_b_ of the second internal electrode layer 16_b_ with the ceramic layer 14 interposed therebetween.

The shape of the fourth dummy electrode 40_d_ is not particularly limited but is preferably a rectangle or substantially a rectangle in the plan view. However, in the plan view, a corner portion may be rounded or may be formed diagonally (e.g., have a tapered shape). In addition, the fourth dummy electrode 40_d_ may have a tapered shape inclined in any direction in the plan view.

The first dummy electrode 40_a_ and the second dummy electrode 40_b_ are preferably exposed at at least one of the first side surface 12_c_ and the second side surface 12_d_, on the same plane as the ceramic layer 14 on which the first internal electrode layer 16_a_ is provided. In addition, the first dummy electrode 40_a_ and the second dummy electrode 40_b_ are more preferably exposed at both the first side surface 12_c_ and the second side surface 12_d_, on the same plane as the ceramic layer 14 on which the first internal electrode layer 16_a_ is provided. With such a configuration, distortion caused during pressing of the multilayer body 12 can be reduced.

The third dummy electrode 40_c_ and the fourth dummy electrode 40_d_ are preferably exposed at at least one of the first end surface 12_e_ and the second end surface 12_f_, on the same plane as the ceramic layer 14 on which the second internal electrode layer 16_b_ is provided. In addition, the third dummy electrode 40_c_ and the fourth dummy electrode 40_d_ are more preferably exposed at both the first end surface 12_e_ and the second end surface 12_f_, on the same plane as the ceramic layer 14 on which the second internal electrode layer 16_b_ is provided. With such a configuration, distortion caused during pressing of the multilayer body 12 can be reduced.

The dummy electrode 40 includes a conductive material as a conductive component. The conductive material of the dummy electrode 40 can be made of an appropriate conductive material, example of which include metals such as Ni, Cu, Ag, Pd, and Au and an alloy including at least one kind of the metals, such as an Ag—Pd alloy.

The dummy electrode 40 includes a region in which a line coverage is, for example, about 50% or less, in an end portion region 44 of the dummy electrode 40 separated from an exposed portion 42 of the dummy electrode 40 toward the center of the multilayer body 12 by, for example, about 50% or more. For example, as FIG. 8A illustrates, the first dummy electrode 40_a_ includes an end portion region 44_a_ in which the line coverage is about 50% or less, in a region separated from an exposed portion 42_a_ of the first dummy electrode 40_a_ toward the center of the multilayer body 12 by about 50% or more. Similarly, the second dummy electrode 40_b_ includes an end portion region 44_b_ in which the line coverage is about 50% or less, in a region separated from an exposed portion 42_b_ of the second dummy electrode 40_b_ toward the center of the multilayer body 12 by about 50% or more. In addition, as FIG. 8B illustrates, the third dummy electrode 40_c_ includes an end portion region 44_c_ in which the line coverage is about 50% or less, in a region separated from an exposed portion 42_c_ of the third dummy electrode 40_c_ toward the center of the multilayer body 12 by about 50% or more. Similarly, the fourth dummy electrode 40_d_ includes an end portion region 44_d_ in which the line coverage is about 50% or less, in a region separated from an exposed portion 42_d_ of the fourth dummy electrode 40_d_ toward the center of the multilayer body 12 by about 50% or more.

The line coverage here means the ratio of the total length of portions of the dummy electrodes in which the conductive component actually exists to the total length of the dummy electrodes 40.

Next, an example of a measuring method of the line coverage will be described. First, in the case of the first dummy electrode 40_a_ and the second dummy electrode 40_b_, the multilayer body 12 is polished to a position of one-half of the multilayer body 12 in the length direction z to expose a WT section. In addition, in the case of the third dummy electrode 40_c_ and the fourth dummy electrode 40_d_, the multilayer body 12 is polished to a position of one-half of the multilayer body 12 in the width direction y to expose an LT section. Next, a picture of the WT section or the LT section is taken by a digital microscope (e.g., by a VHX manufactured by KEYENCE CORPORATION). Next, each of the sectional images is subjected to image recognition by using an image processing software (e.g., using HALCON manufactured by MVTec Software GmbH). In the case of the WT section, for example, a measurement region F is preferably a quadrilateral region of about 5 μm in the width direction y and about 30 μm in the lamination direction x. In the case of the LT section, for example, a measurement region F is preferably a quadrilateral region of about 5 μm in the length direction z and about 30 μm in the lamination direction x. The coverage is calculated by the ratio of the total length of portions of the dummy electrodes in which the conductive component actually exists to the total length of the dummy electrodes 40 within the region. Thus, the region in which the line coverage is, for example, about 50% or less means a region in which the ratio of the total length of portions of the dummy electrodes in which the conductive component actually exists to the total length of the dummy electrodes 40 is, for example, about 50% or less. For example, FIG. 9 illustrates measurement regions $F_1$ to $F_N$ of the line coverage of the first dummy electrodes 40_a_ in the WT section. The line coverage is measured, in the measurement regions $F_1$ to $F_N$, by calculating the total length of the first dummy electrodes 40_a_ and the total length of portions of the first dummy electrodes 40_a_ in which the conductive component exists.

By providing the region in which the line coverage is, for example, about 50% or less in the end portion region 44 of the dummy electrode as described above, the ceramic layers 14 can be bonded to each other with a pore 46 interposed therebetween, and the effect of leading to the improvement of the bonding strength between the ceramic layers 14 and the improvement in moisture resistance reliability is thereby exhibited. In addition, due to such pores 46, current hardly flows to the distal end of the end portion region 44 of the dummy electrode 40, and the current path can thereby be shortened; thus, the effect of leading to reduction in ESL is thereby also exhibited. Moreover, when moisture penetrates from the outside, the moisture is selectively collected in a concentrated manner in the end portion region 44 of the dummy electrode 40 in which the line coverage is about 50% or less, and the effect of ensuring the moisture resistance reliability of the effective layer portion 15_a_ is thereby exhibited.

In addition, the proportion of the area of the pores 46 to the area of the end portion region 44 of the dummy electrode 40 is, for example, preferably about 50% or more and about 80% or less. By setting the proportion of the area of the pores 46 to the area of the end portion region 44 of the dummy electrode 40 at about 50% or more, the ceramic layers 14 can be bonded with the pores 46 interposed therebetween, and the effect of leading to the improvement of the bonding strength between the ceramic layers 14 and the improvement in moisture resistance reliability is thereby exhibited. Moreover, when moisture penetrates from the outside, the moisture is selectively collected in a concentrated manner in the end portion region 44 of the dummy electrode 40 in which the line coverage is about 50% or less, and the advantageous effect of ensuring the moisture resistance reliability of the effective layer portion 15*a* is thereby exhibited. In addition, by setting the proportion of the area of the pores 46 to the area of the end portion region 44 of the dummy electrode 40 at about 80% or less, the current does not flow to the distal end of the end portion region 44 of the dummy electrode 40 due to the pores 46 and can be shortened, and the effect of leading to reduction in ESL is thereby exhibited. On the other hand, when the proportion of the area of the pores 46 to the area of the end portion region 44 of the dummy electrode 40 is greater than about 80%, the internal electrode layer 16 and the dummy electrode 40 have different thicknesses, and the level difference left between the internal electrode layer 16 and the dummy electrode 40 is increased. Thus, a portion having a small thickness in the lamination direction x of the multilayer body 12 is thereby generated locally in the multilayer body 12 by pressing the level difference portion During pressing, and the risk of reduction in moisture resistance reliability is increased.

Here, a thickness of the first internal electrode layer 16*a* in the lamination direction x is referred to as $t_1$, and a thickness of the second internal electrode layer 16*b* in the lamination direction x is referred to as $t_2$. In addition, a thickness of the first dummy electrode 40*a* in the lamination direction x is referred to as $t_3$, a thickness of the second dummy electrode 40*b* in the lamination direction x is referred to as $t_4$, a thickness of the third dummy electrode 40*c* in the lamination direction x is referred to as $t_5$, and a thickness of the fourth dummy electrode 40*d* in the lamination direction x is referred to as $t_6$.

Each of the thicknesses $t_3$, $t_4$, $t_5$, and to of the dummy electrodes 40 is preferably smaller than a corresponding one of the thicknesses $t_1$ and $t_2$ of the internal electrode layers 16. More specifically, each of the thicknesses $t_3$, $t_4$, $t_5$, and $t_6$ of the dummy electrodes 40 is, for example, preferably about 75% or more and about 95% or less relative to a corresponding one of the thicknesses $t_1$ and $t_2$ of the internal electrode layers 16. By setting each of the thicknesses $t_3$, $t_4$, $t_5$, and $t_6$ of the dummy electrodes 40 at, for example, about 75% or more and about 95% or less relative to a corresponding one of the thicknesses $t_1$ and $t_2$ of the internal electrode layers 16, the level difference can be filled sufficiently, and distortion caused during pressing of the internal electrode layers 16 and the ceramic layers 14 can be reduced.

In addition, a length $w_1$, in the width direction y of the multilayer body 12, of the first dummy electrode 40*a* exposed at the first side surface 12*c* is, for example, preferably about 50% or more and about 60% or less of a length $w_3$, in the width direction y of the multilayer body 12, of the third extended portion 20*c* of the second internal electrode layer 16*b*. By setting the length $w_1$, in the width direction y of the multilayer body 12, of the first dummy electrode 40*a* exposed at the first side surface 12*c* at about 50% or more and about 60% or less of the length $w_3$, in the width direction y of the multilayer body 12, of the third extended portion 20*c* of the second internal electrode layer 16*b*, distortion caused during pressing of the multilayer body 12 can be reduced while the current path is also maintained at a suitable length. Similarly, a length $w_2$, in the width direction y of the multilayer body 12, of the second dummy electrode 40*b* exposed at the second side surface 12*d* is, for example, preferably about 50% or more and about 60% or less of a length $w_4$, in the width direction y of the multilayer body 12, of the fourth extended portion 20*d* of the second internal electrode layer 16*b*. By setting the length $w_2$, in the width direction y of the multilayer body 12, of the second dummy electrode 40*b* exposed at the second side surface 12*d* at about 50% or more and about 60% or less of the length $w_4$, in the width direction y of the multilayer body 12, of the fourth extended portion 20*d* of the second internal electrode layer 16*b*, distortion caused during pressing of the multilayer body 12 can be reduced while the current path is also maintained at a suitable length.

Moreover, a center portion $M_1$, in the length direction z of the multilayer body 12, of the first dummy electrode 40*a* exposed at the first side surface 12*c* is, for example, preferably at a position within about 3% from a center portion M, in the length direction z of the multilayer body 12, of the second internal electrode layer 16*b*. With such an arrangement, the dummy electrode 40 and the second internal electrode layer 16*b* can be pressed uniformly, and the advantageous effect of reducing or preventing a structural defect such as peeling between the ceramic layers 14 is thereby exhibited. Similarly, a center portion $M_2$, in the length direction z of the multilayer body 12, of the second dummy electrode 40*b* exposed at the second side surface 12*d* is, for example, preferably at a position within 3% from the center portion M, in the length direction z of the multilayer body 12, of the second internal electrode layer 16*b*. With such an arrangement, the dummy electrode 40 and the second internal electrode layer 16*b* can be pressed uniformly, and the advantageous effect of reducing or preventing a structural defect such as peeling between the ceramic layers 14 is thereby exhibited.

In addition, a length $l_1$, in the length direction z of the multilayer body 12, of the third dummy electrode 40*c* exposed at the first end surface 12*e* is, for example, preferably about 50% or more and about 60% or less of a length $l_3$, in the length direction z of the multilayer body 12, of the first extended portion 20*a* of the first internal electrode layer 16*a*. By setting the length $l_1$, in the length direction z of the multilayer body 12, of the third dummy electrode 40*c* exposed at the first end surface 12*e* at about 50% or more and about 60% or less of the length $l_3$, in the length direction z of the multilayer body 12, of the first extended portion 20*a* of the first internal electrode layer 16*a*, distortion caused during pressing of the multilayer body 12 can be reduced while the current path is also maintained at a suitable length. Similarly, a length $l_2$, in the length direction z of the multilayer body 12, of the fourth dummy electrode 40*d* exposed at the second end surface 12*f* is, for example, preferably about 50% or more and about 60% or less of a length $l_4$, in the length direction z of the multilayer body 12, of the second extended portion 20*b* of the first internal electrode layer 16*a*. By setting the length $l_2$, in the length direction z of the multilayer body 12, of the fourth dummy electrode 40*d* exposed at the second end surface 12*f* at about 50% or more and about 60% or less of the length $l_4$, in the length direction z of the multilayer body 12, of the second extended portion 20*b* of the first internal electrode layer 16*a*, distortion caused during pressing of the multilayer body 12 can be reduced while the current path is also maintained at a suitable length.

Moreover, a center portion $N_1$, in the width direction y of the multilayer body 12, of the third dummy electrode 40*c* exposed at the first end surface 12*e* is preferably at a position within 3% from a center portion N, in the width direction y of the multilayer body 12, of the first internal electrode layer 16*a*. With such an arrangement, the dummy electrode 40 and the first internal electrode layer 16*a* can be pressed uniformly, and the advantageous effect of reducing or preventing a structural defect such as, for example, peeling between the ceramic layers 14 is thereby exhibited. Similarly, a center portion $N_2$, in the width direction y of the multilayer body 12, of the fourth dummy electrode 40*d* exposed at the second end surface 12*f* is, for example, preferably at a position within about 3% from the center portion N, in the width direction y of the multilayer body 12, of the first internal electrode layer 16*a*. With such an arrangement, the dummy electrode 40 and the first internal electrode layer 16*a* can be pressed uniformly, and the effect of reducing or preventing a structural defect such as, for example, peeling between the ceramic layers 14 is thereby exhibited.

Outer Electrode

The outer electrodes 30 include a first outer electrode 30*a*, a second outer electrode 30*b*, a third outer electrode 30*c*, and a fourth outer electrode 30*d*.

The first outer electrode 30*a* is provided on the first end surface 12*e* and connected to the first internal electrode layer 16*a*. The first outer electrode 30*a* may also be provided on a portion of the first main surface 12*a* and a portion of the second main surface 12*b*, and a portion of the first side surface 12*c* and a portion of the second side surface 12*d*.

The second outer electrode 30*b* is provided on the second end surface 12*f* and connected to the first internal electrode layer 16*a*. The second outer electrode 30*b* may also be provided on a portion of the first main surface 12*a* and a portion of the second main surface 12*b*, and a portion of the first side surface 12*c* and a portion of the second side surface 12*d*.

The third outer electrode 30*c* is provided on the first side surface 12*c* and connected to the second internal electrode layer 16*b*. The third outer electrode 30*c* may also be provided on a portion of the first main surface 12*a* and a portion of the second main surface 12*b*.

The fourth outer electrode 30*d* is provided on the second side surface 12*d* and connected to the second internal electrode layer 16*b*. The fourth outer electrode 30*d* may also be provided on a portion of the first main surface 12*a* and a portion of the second main surface 12*b*.

The first outer electrode 30*a*, the second outer electrode 30*b*, the third outer electrode 30*c*, and the fourth outer electrode 30*d* each preferably include an underlying electrode layer 32 and a plated layer 34.

In other words, the first outer electrode 30*a* preferably includes a first underlying electrode layer 32*a* and a first plated layer 34*a*. The second outer electrode 30*b* preferably includes a second underlying electrode layer 32*b* and a second plated layer 34*b*. The third outer electrode 30*c* preferably includes a third underlying electrode layer 32*c* and a third plated layer 34*c*. The fourth outer electrode 30*d* preferably includes a fourth underlying electrode layer 32*d* and a fourth plated layer 34*d*.

The underlying electrode layer 32 includes the first underlying electrode layer 32*a*, the second underlying electrode layer 32*b*, the third underlying electrode layer 32*c*, and the fourth underlying electrode layer 32*d*. The underlying electrode layer 32 preferably includes at least one of, for example, a baked layer, a conductive resin layer, and a thin film layer.

First, the case where the underlying electrode layer 32 is made of a baked layer will be described. The baked layer includes a glass component and a metal component. The glass component of the baked layer includes at least one selected from, for example, B, Si, Ba, Mg, Al, and Li. In addition, the baked layer includes, as the metal component, at least one of, for example, Cu, Ni, Ag, Pd, an Ag—Pd alloy, and Au. Moreover, multiple baked layers may be provided.

The baked layer is a layer into which a conductive paste including the glass component and the metal component is applied to the multilayer body 12 and baked. The baked layer may be a layer formed by simultaneously firing a multilayer chip including the internal electrode layers 16 and the ceramic layers 14 and a conductive paste applied to the multilayer chip, or the baked layer may also be a layer made of obtaining the multilayer body 12 by firing a multilayer chip including the internal electrode layers 16 and the ceramic layers 14, and then by baking a conductive paste applied to the multilayer body 12. Note that, in the case where the multilayer chip including the internal electrode layers 16 and the ceramic layers 14 and a conductive paste applied thereto are fired simultaneously, a conductive paste to which a ceramic component, instead of the glass component, is added is baked to form the baked layer.

At center portions, in the lamination direction X connecting the first main surface 12*a* and the second main surface 12*b*, of a first baked layer and a second baked layer positioned on the first end surface 12*e* and the second end surface 12*f*, the thickness (e.g., end-surface center thickness), in the length direction z connecting the first end surface 12*e* and the second end surface 12*f*, of each of the first baked layer and the second baked layer is preferably, for example, about 5 μm or more and about 30 μm or less.

In addition, in the case where the baked layer is also provided on a portion of the first main surface 12*a* or a portion of the second main surface 12*b*, at center portions, in the length direction z connecting the first end surface 12*e* and the second end surface 12*f*, of the first baked layer and the second baked layer positioned on the first main surface 12*a* and the second main surface 12*b*, the thickness, in the lamination direction X connecting the first main surface 12*a* and the second main surface 12*b*, of each of the first baked layer and the second baked layer is preferably, for example, about 5 μm or more and about 10 μm or less.

Next, the case where the underlying electrode layer 32 is made of a conductive resin layer will be described. The conductive resin layer may be provided on the baked layer so as to cover the baked layer or may be disposed directly on the multilayer body 12 without providing the baked layer. In addition, the conductive resin layer may cover the upper side of the baked layer entirely or may cover a portion of the baked layer. Moreover, multiple conductive resin layers may be provided.

The conductive resin layer preferably includes, for example, a thermosetting resin and a metal. Since including such a thermosetting resin, the conductive resin layer is more flexible than, for example, a plated film and a baked layer provided by a fired conductive paste. Thus, even when a physical impact or an impact induced by heat cycle acts on the multilayer ceramic capacitor 10, the conductive resin layer functions as a shock-absorbing layer to prevent a crack of the multilayer ceramic capacitor 10.

Examples of a usable metal included in the conductive resin layer include Ag, Cu, Ni, Sn, and Bi and alloys including the metals. In addition, a metal powder whose particles have surfaces coated with Ag can also be used.

When such a metal powder whose particles have Ag-coated surfaces is used, examples of a preferable metal powder include metal powders of Cu, Ni, Sn, and Bi and alloy powders of the metals. The reason for the use of such a conductive metal powder of Ag for a conductive metal is that Ag is suitable for an electrode material since having the lowest specific resistance in metals, and Ag, as a noble metal, is not oxidized and has high weather resistance. Another reason is that a metal for a base material can be at low cost while the characteristics of Ag described above are maintained.

Moreover, as a metal included in the conductive resin layer, for example, Cu and Ni subjected to an antioxidant treatment can also be used. Note that, as a metal included in the conductive resin layer, a metal powder whose particles have surfaces coated with, for example, Sn, Ni, or Cu can also be used. When such a metal powder whose particles have surfaces coated with Sn, Ni, or Cu is used, examples of a preferable metal powder include metal powders of Ag, Cu, Ni, Sn, and Bi and alloy powders of the metals.

The metal included in the conductive resin layer is mainly responsible for the current-carrying property of the conductive resin layer. Specifically, particles of a conductive filler are in contact with one another to form a current-carrying path inside the conductive resin layer.

The metal included in the conductive resin layer can have, for example, a spherical shape or a flat shape, but a spherical metal powder and a flat metal powder are preferably used in combination.

Examples of a usable resin for the conductive resin layer include various known thermosetting resins such as an epoxy resin, a phenol resin, a urethane resin, a silicone resin, and a polyimide resin. Among the resins, the epoxy resin excellent in, for example, heat resistance, moisture resistance, and close contact performance is one of the most suitable resins.

The conductive resin layer also preferably includes a curing agent with the thermosetting resin. When an epoxy resin is used as a base resin, examples of a usable curing agent for the epoxy resin include various known compounds such as a phenol-based compound, an amine-based compound, an acid anhydride-based compound, an imidazole-based compound, an active ester-based compound, and an amide-imide-based compound.

The thickness of the thickest portion of the conductive resin layer is preferably, for example, 5 μm or more and 30 μm or less.

Next, the case where the underlying electrode layer 32 is made of a thin film will be described. When such a thin film layer is provided as the underlying electrode layer 32, the thin film layer is made of a thin film forming method such as, for example, a sputtering method or a vapor deposition method. The thin film layer is a layer of, for example, about 1 μm or less made of accumulating metal particles.

Plated Layer

The plated layers 34 include the first plated layer 34*a* provided to cover the first underlying electrode layer 32*a*, the second plated layer 34*b* provided to cover the second underlying electrode layer 32*b*, the third plated layer 34*c* provided to cover the third underlying electrode layer 32*c*, and the fourth plated layer 34*d* provided to cover the fourth underlying electrode layer 32*d*.

The plated layer 34 includes at least one of, for example, Cu, Ni, Sn, Ag, Pd, an Ag—Pd alloy, and Au.

In addition, the plated layer 34 may be provided by multiple layers. The plated layer 34 preferably includes a two-layer structure of a Ni plating and a Sn plating arranged in this order. The Ni plated layer can prevent the underlying electrode layer 32 from being eroded by solder used when the multilayer ceramic capacitor 10 is mounted. In addition, the Sn plated layer can improve the wettability of solder when the multilayer ceramic capacitor 10 is mounted and can thus facilitate the mounting.

In addition, the per-layer thickness of the plated layer 34 is, for example, preferably about 4 μm or more and about 10 μm or less.

In one or each of the first outer electrode 30*a*, the second outer electrode 30*b*, the third outer electrode 30*c*, and the fourth outer electrode 30*d*, the plated layer 34 may be provided directly on a surface of the multilayer body 12. That is, the multilayer ceramic capacitor 10 may have a structure including the plated layer 34 electrically connected directly to the first internal electrode layer 16*a* and/or the second internal electrode layer 16*b*. In such a case, after a catalyst is provided on a surface of the multilayer body 12 as a preliminary treatment, the plated layer 34 may be formed directly thereon.

In the case where the plated layer 34 is provided directly on the multilayer body 12 without providing the underlying electrode layer 32, the design flexibility of a thin chip can be improved because the reduction of the thickness of the underlying electrode layer 32 is translatable into reduction in profile, that is, reduction in thickness, or into increase in the thickness of the multilayer body 12, that is, the thickness of the effective layer portion 15*a*.

When the plated layer 34 is provided directly on the multilayer body 12, the plated layer 34 preferably includes a lower plated electrode formed on a surface of the multilayer body 12 and an upper plated electrode formed on a surface of the lower plated electrode.

The lower plated electrode and the upper plated electrode each preferably include at least one kind of metal selected from, for example, Cu, Ni, Sn, Pb, Au, Ag, Pd, Bi, and Zn or an alloy including at least one of the metals.

The lower plated electrode is preferably made of using Ni having solder barrier performance. In addition, the upper plated electrode is, for example, preferably made of using Sn or Au having good solder wettability.

For example, when the first internal electrode layer 16*a* and the second internal electrode layer 16*b* are made of using Ni, the lower plated electrode is preferably made of using Cu having a good bonding property with Ni. Note that the upper plated electrode may be formed as required, and the first outer electrode and the second outer electrode may be formed only by the lower plated electrode.

When the plated layer 34 is provided directly on the multilayer body 12, in the plated layer 34, the upper plated electrode may define and function as the outermost layer, or another plated electrode may further be provided on a surface of the upper plated electrode.

When the plated layer 34 is provided directly on the multilayer body 12, the per-layer thickness of the plated layer 34 is, for example, preferably about 4 μm or more and about 10 μm or less.

When the plated layer 34 is provided directly on the multilayer body 12, the plated layer 34 preferably includes no glass. In addition, the proportion of metal per unit volume of the plated layer 34 is, for example, preferably about 99 vol % or more.

According to the multilayer ceramic capacitor 10 illustrated in FIG. 1, in the dummy electrode 40, the line coverage of the conductive component is, for example, smaller than about 50% in the region 44 separated from the exposed portion 42 of the dummy electrode 40 toward the center of the multilayer body 12 by about 50% or more. With such a configuration, the ceramic layers 14 can be bonded with the pores 46 interposed therebetween, and it is thereby possible to improve the bonding strength between the ceramic layers 14 and also the moisture resistance reliability. In addition, current does not flow to a distal end of the dummy electrode 40 due to the pores 46, and the current path can thereby be shortened, which also leads to reduction in ESL. Moreover, when moisture penetrates from the outside, the moisture is selectively collected in a concentrated manner in the end portion region 44 of the dummy electrode 40 in which the line coverage is, for example, about 50% or less, and the effect of ensuring the moisture resistance reliability of the effective layer portion 15*a* is thereby exhibited.

In addition, the dummy electrodes 40 (40*a* and 40*b*) of the multilayer ceramic capacitor 10 illustrated in FIG. 1 are preferably exposed at at least one of the first side surface 12*c* and the second side surface 12*d*, on the ceramic layer 14 on which the first internal electrode layer 16*a* is provided. With this configuration, distortion caused during pressing of the multilayer body 12 can be reduced.

In addition, the dummy electrodes 40 (40*c* and 40*d*) of the multilayer ceramic capacitor 10 illustrated in FIG. 1 are preferably exposed at at least one of the first end surface 12*e* and the second end surface 12*f*, on the ceramic layer 14 on which the second internal electrode layer 16*b* is provided. With this configuration, distortion caused during pressing of the multilayer body 12 can be reduced.

In addition, each of the thicknesses $t_3$, $t_4$, $t_5$, and $t_6$, in the lamination direction x, of the dummy electrodes 40 of the multilayer ceramic capacitor 10 illustrated in FIG. 1 is preferably smaller than a corresponding one of the thicknesses $t_1$ and $t_2$, in the lamination direction x, of the first internal electrode layer 16*a* and the second internal electrode layer 16*b*. Moreover, each of the thicknesses $t_3$, $t_4$, $t_5$, and $t_6$, in the lamination direction x, of the dummy electrodes 40 of the multilayer ceramic capacitor 10 illustrated in FIG. 1 is, for example, preferably about 75% or more and about 95% or less of a corresponding one of the thicknesses $t_1$ and $t_2$, in the lamination direction x, of the first internal electrode layer 16*a* and the second internal electrode layer 16*b*. With this configuration, the level difference (a difference between each of the thicknesses $t_3$, $t_4$, $t_5$, and $t_6$, in the lamination direction x, of the dummy electrodes 40 and a corresponding one of the thicknesses $t_1$ and $t_2$, in the lamination direction x, of the first internal electrode layer 16*a* and the second internal electrode layer 16*b*) can be filled sufficiently, and distortion caused during pressing of the internal electrode layers 16 and the ceramic layers 14 can be decreased.

In addition, each of the lengths $w_1$ and $w_2$, in the width direction y of the multilayer body 12, of the dummy electrodes 40*a* and 40*b* exposed at the first side surface 12*c* and the second side surface 12*d* of the multilayer ceramic capacitor 10 illustrated in FIG. 1 is, for example, preferably about 50% or more and about 60% or less of a corresponding one of the lengths $w_3$ and $w_4$, in the width direction y of the multilayer body 12, of the third extended portion 20*c* of the second internal electrode layer 16*b* and the fourth extended portion 20*d* of the second internal electrode layer 16*b*. With this configuration, distortion caused during pressing of the multilayer body 12 can be reduced while the current path is also maintained at a suitable length.

In addition, the center portions $M_1$ and $M_2$, in the length direction z of the multilayer body 12, of the dummy electrodes 40*a* and 40*b* exposed at the first side surface 12*c* or the second side surface 12*d* of the multilayer ceramic capacitor 10 illustrated in FIG. 1 are preferably at positions within 3% from the center portion M, in the length direction z of the multilayer body 12, of the second internal electrode layer 16*b* exposed at the first side surface 12*c* or the second side surface 12*d*. With this configuration, the dummy electrodes 40*a* and 40*b* and the second internal electrode layer 16*b* can be pressed uniformly, and the effect of reducing or preventing a structural defect such as peeling between the ceramic layers 14 is thereby exhibited.

In addition, in the dummy electrode 40 of the multilayer ceramic capacitor 10 illustrated in FIG. 1, the proportion of the area of the pores 46 to the area of the region 44 separated from the exposed portion 42 of the dummy electrode 40 toward the center of the multilayer body 12 by, for example, about 50% or more is preferably about 50% or more and about 80% or less. With this configuration, the ceramic layers 14 can be bonded with the pores 46 interposed therebetween, and the effect of leading to the improvement of the bonding strength between the ceramic layers 14 and the improvement in moisture resistance reliability is thereby exhibited. Moreover, when moisture penetrates from the outside, the moisture is selectively collected in a concentrated manner in the end portion region 44 of the dummy electrode 40 in which the line coverage is, for example, about 50% or less, and the effect of ensuring the moisture resistance reliability of the effective layer portion 15*a* is thereby exhibited. The current path does not flow to the distal end of the end portion region 44 of the dummy electrode 40 due to the pores 46 and can thereby be shortened, and the effect of leading to reduction in ESL is thereby exhibited.

2. Manufacturing Method of Multilayer Ceramic Electronic Component

Hereinafter, a manufacturing method of the multilayer ceramic capacitor 10 that is one example of the multilayer ceramic electronic component according to the present invention will be described.

First, dielectric sheets and a conductive paste for an internal electrode and a dummy electrode are prepared. The dielectric sheets and the conductive paste for the internal electrode and the dummy electrode include a binder and a solvent. A known binder and solvent can be used.

Next, the conductive paste for the internal electrode and the dummy electrode is applied in a predetermined pattern on the dielectric sheet by, for example, screen printing or gravure printing. Thus, the dielectric sheets with the patterns of the internal electrode layers and the dummy electrodes are prepared. More specifically, the internal electrode layer 16 and the dummy electrode 40 can be printed as follows. A screen plate for printing the first internal electrode layer 16*a* and the first dummy electrode 40*a* and the second dummy electrode 40*b*, and a screen plate for printing the second internal electrode layer 16*b* and the third dummy electrode 40*c* and the fourth dummy electrode 40*d* are prepared separately, and printing, as illustrated in FIG. 14A, is preferably made using a printing machine that can print the two kinds of screen plates separately. FIG. 14A illustrates the printing patterns of the internal electrode layers and the dummy electrodes in the present example embodiment. That is, a pattern 80 for the first internal electrode layer 16*a* and the first dummy electrode 40*a* and the second dummy electrode 40*b*, and a pattern 82 for the second internal electrode layer 16*b* and the third dummy electrode 40*c* and the fourth dummy electrode 40*d* are printed, and, when the multilayer body is cut in a downstream process, cutting is performed along cut lines 90 illustrated by broken lines in FIG. 14A. Thus, the multilayer body 12 including the first internal electrode layer 16*a*, the second internal electrode layer 16*b*, the first dummy electrode 40*a*, the second dummy electrode 40*b*, the third dummy electrode 40*c*, and the fourth dummy electrode 40*d* can be produced.

In the present example embodiment, the first dummy electrode 40*a*, the second dummy electrode 40*b*, the third dummy electrode 40*c*, and the fourth dummy electrode 40*d* are provided, but this configuration is not the only option. That is, for example, when the first dummy electrode 40*a* and the second dummy electrode 40*b* are provided, but the third dummy electrode 40*c* and the fourth dummy electrode 40*d* are not provided, a part to be the effective layer portion 15*a* including the first dummy electrode 40*a* and the second dummy electrode 40*b* but not including the third dummy electrode 40*c* and the fourth dummy electrode 40*d* can be made of printing the first internal electrode layer 16*a*, the second internal electrode layer 16*b*, the first dummy electrode 40*a*, and the second dummy electrode 40*b* as illustrated in FIG. 14B. In addition, for example, when the first dummy electrode 40*a* and the second dummy electrode 40*b* are not provided, but the third dummy electrode 40*c* and the fourth dummy electrode 40*d* are provided, a part to be the effective layer portion 15*a* not including the first dummy electrode 40*a* and the second dummy electrode 40*b* but including the third dummy electrode 40*c* and the fourth dummy electrode 40*d* can be made of printing the first internal electrode layer 16*a*, the second internal electrode layer 16*b*, the third dummy electrode 40*c*, and the fourth dummy electrode 40*d* as illustrated in FIG. 14C.

Here, to obtain a desired structure, such a part to be the effective layer portion 15*a* is made of stacking sheets on which the internal electrode layers 16 and the dummy electrodes 40 are printed. In the present example embodiment, the patterns of the internal electrodes and the dummy electrodes are printed by gravure printing.

Next, a predetermined number of dielectric sheets on which no pattern of the internal electrode layer is printed are stacked to form a part to be the first outer layer portion 15*b*1 closer to the first main surface 12*a*. Subsequently, the part to be the effective layer portion 15*a* prepared as described above is stacked, and a predetermined number of dielectric sheets on which no pattern of the internal electrode layer is printed are stacked to form a part to be the second outer layer portion 15*b*2 closer to the second main surface 12*b*. Thus, the stacked sheets are produced.

Next, the stacked sheets are pressed in the lamination direction by, for example, an isostatic press to produce a multilayer block.

The multilayer block is then cut into multilayer chips of predetermined size. At this time, a corner portion and a ridge portion of the multilayer chip may be rounded by, for example, barrel polishing.

Next, the multilayer chip is fired into the multilayer body 12. Depending on ceramic and the material of the internal electrode, the firing temperature is, for example, preferably about 900° C. or more and about 1400° C. or less.

The first underlying electrode layer 32*a* of the first outer electrode 30*a* and the second underlying electrode layer 32*b* of the second outer electrode 30*b* are formed on the first end surface 12*e* and the second end surface 12*f* of the multilayer body 12 obtained by the firing. The third underlying electrode layer 32*c* of the third outer electrode 30*c* and the fourth underlying electrode layer 32*d* of the fourth outer electrode 30*d* are further formed on the first side surface 12*c* and the second side surface 12*d* of the multilayer body 12 obtained by the firing.

When a baked layer is formed as the underlying electrode layer 32, a conductive paste including a glass component and a metal component is applied and is then subjected to a baking treatment to form the underlying electrode layer 32. The temperature of the baking treatment at this time is, for example, preferably about 700° C. or more and about 900° C. or less. In the present example embodiment, the underlying electrode layer 32 is made of the baked layer.

Here, various methods can be used as a method for forming the baked layer as the underlying electrode layer 32. For example, for the third underlying electrode layer 32*c* and the fourth underlying electrode layer 32*d*, a method in which a conductive paste is extruded from a slit and applied can be used. In the case of this method, by increasing the extrusion amount of the conductive paste, the third underlying electrode layer 32*c* and the fourth underlying electrode layer 32*d* can be formed on, in addition to the first side surface 12*c* and the second side surface 12*d*, a portion of the first main surface 12*a* and a portion of the second main surface 12*b*.

Such formation can also be achieved by using, for example, a roller transfer method. In the case of the roller transfer method, when the underlying electrode layer 32 is formed on, in addition to the first side surface 12*c* and the second side surface 12*d*, a portion of the first main surface 12*a* and a portion of the second main surface 12*b*, the third underlying electrode layer 32*c* and the fourth underlying electrode layer 32*d* can be formed on a portion of the first main surface 12*a* and a portion of the second main surface 12*b* by increasing a pressing pressure applied during roller transfer.

Next, the first underlying electrode layer 32*a* of the first outer electrode 30*a* and the second underlying electrode layer 32*b* of the second outer electrode 30*b* are formed on the first end surface 12*e* and the second end surface 12*f* of the multilayer body 12 obtained by the firing. In the first underlying electrode layer 32*a* and the second underlying electrode layer 32*b*, when baked layers are formed as the underlying electrode layers 32 as with the third underlying electrode layer 32*c* and the fourth underlying electrode layer 32*d*, a conductive paste including a glass component and a metal component is applied and is then subjected to a baking treatment to form the underlying electrode layers 32. The temperature of the baking treatment at this time is, for example, preferably about 700° C. or more and about 900° C. or less.

Here, various methods can be used as a method for forming the first underlying electrode layer 32*a* and the second underlying electrode layer 32*b*. For example, by using a method such as dipping, the first underlying electrode layer 32*a* and the second underlying electrode layer 32*b* can be formed so as to extend to, in addition to the first end surface 12*e* and the second end surface 12*f*, a portion of the first main surface 12*a* and a portion of the second main surface 12*b*, and a portion of the first side surface 12*c* and a portion of the second side surface 12*d*.

In the present example embodiment, the first underlying electrode layer 32*a* and the second underlying electrode layer 32*b* are made of using a DIP method so as to extend to, in addition to the first end surface 12*e* and the second end surface 12*f*, a portion of the first main surface 12*a* and a portion of the second main surface 12*b*, and a portion of the first side surface 12*c* and a portion of the second side surface 12*d*.

In addition, although the first underlying electrode layer 32*a* and the second underlying electrode layer 32*b* are fired after the third underlying electrode layer 32*c* and the fourth underlying electrode layer 32*d* are fired in the present example embodiment, the first underlying electrode layer 32*a* and the second underlying electrode layer 32*b*, and the third underlying electrode layer 32*c* and the fourth underlying electrode layer 32*d* may be fired simultaneously.

When the underlying electrode layer 32 is made of a conductive resin layer, the conductive resin layer can be formed by, for example, the following method. The conductive resin layer may be formed on a surface of the baked layer, or only the conductive resin layer may be provided directly on the multilayer body without forming the baked layer.

As the forming method of the conductive resin layer, a conductive resin paste including a thermosetting resin and a metal component is applied to the baked layer or the multilayer body and is subjected to a heat treatment at a temperature of, for example, about 250° C. or more and about 550° C. or less, and the resin is thermally set to form the conductive resin layer. The atmosphere during the heat treatment at this time is preferably a $N_2$ atmosphere. In addition, the concentration of oxygen is preferably maintained to, for example, about 100 ppm or less to prevent the resin from scattering and to prevent various kinds of metal components from being oxidized.

As with the method in which the underlying electrode layer 32 is made of the baked layer, an application method of the conductive resin paste can be, for example, a method in which a conductive paste is extruded from a slit and applied or a roller transfer method.

When the underlying electrode layer 32 is made of the thin film layer, for example, masking is performed, and the underlying electrode layer 32 can be formed at a spot where the underlying electrode layer 32 is intended to be formed, by a thin film forming method such as a sputtering method or a vapor deposition method. The underlying electrode layer 32 made of the thin film layer is a layer of, for example, about 1 μm or less made of accumulating metal particles.

Lastly, the plated layer 34 is formed. The plated layer 34 may be formed on a surface of the underlying electrode layer 32 or may be provided directly on the multilayer body 12. In the present example embodiment, the plated layer 34 is formed on a surface of the underlying electrode layer 32. More specifically, a Ni plated layer and a Sn plated layer are formed on the underlying electrode layer 32. For performing a plating treatment, any one of electrolytic plating and electroless plating may be adopted. However, such electroless plating has the disadvantage of increasing complexity of manufacturing processes because a preliminary treatment with, for example, a catalyst is required for improvement in plating precipitation rate. Thus, electrolytic plating is usually preferably adopted.

The multilayer ceramic capacitor 10 in FIG. 1 can be manufactured as described above.

Although an example embodiment of the present invention has so far been disclosed in the above description, the present invention is not limited thereto.

That is, various modifications can be made to the above-described example embodiment and modification examples with regard to, for example, the mechanisms, the shapes, the materials, the quantities, the positions, or the arrangements, without departing from the scope of the technical ideas and objects of the present invention, and the present invention includes the modifications.

In addition, although a three-terminal multilayer ceramic capacitor is described in the present example embodiment, for example, application to a two-terminal multilayer ceramic electronic component is possible. That is, a multilayer ceramic electronic component includes a multilayer body including ceramic layers and multiple internal electrode layers, the multilayer body including a first main surface and a second main surface that oppose each other in a lamination direction, a first side surface and a second side surface that oppose each other in a width direction orthogonal or substantially orthogonal to the lamination direction, and a first end surface and a second end surface that oppose each other in a length direction orthogonal or substantially orthogonal to the lamination direction and to the width direction, and multiple outer electrodes, in which the multiple internal electrode layers include a first internal electrode layer laminated alternately with the multiple ceramic layers and exposed at the first end surface and the second end surface and a second internal electrode layer laminated alternately with the multiple ceramic layers and exposed at the first side surface and the second side surface, the multilayer ceramic electronic component further includes a dummy electrode spaced apart from the first internal electrode layer and the second internal electrode layer and exposed at one of the first end surface and the second end surface, the multiple outer electrodes include a first outer electrode provided on the first end surface and connected to the first internal electrode layer and a second outer electrode provided on the second end surface and connected to the second internal electrode layer, and, in the dummy electrode, a line coverage of a conductive component is smaller than about 50% in a region separated from an exposed portion of the dummy electrode toward a center of the multilayer body by about 50% or more. With such a configuration, peeling between the ceramic layers can be prevented.

INDUSTRIAL APPLICABILITY

Example embodiments of the present invention relate to a multilayer ceramic electronic component and can be used as a multilayer ceramic electronic component that can prevent peeling between ceramic layers.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including multiple ceramic layers that are laminated and multiple internal electrode layers that are laminated, a first main surface and a second main surface that oppose each other in a lamination direction, a first side surface and a second side surface that oppose each other in a width direction orthogonal or substantially orthogonal to the lamination direction, and a first end surface and a second end surface that oppose each other in a length direction orthogonal or substantially orthogonal to the lamination direction and to the width direction, and multiple outer electrodes; wherein the multiple internal electrode layers include:

a first internal electrode layer laminated alternately with the multiple ceramic layers and exposed at the first end surface and the second end surface; and a second internal electrode layer laminated alternately with the multiple ceramic layers and exposed at the first side surface and the second side surface;

the multilayer ceramic electronic component further includes a dummy electrode spaced apart from the first internal electrode layer and the second internal electrode layer and exposed at one of the first end surface, the second end surface, the first side surface, and the second side surface;

the multiple outer electrodes include:

a first outer electrode and a second outer electrode connected to the first internal electrode layer; and a third outer electrode and a fourth outer electrode connected to the second internal electrode layer; and in the dummy electrode, a line coverage of a conductive component is smaller than about 50% in a region separated from an exposed portion of the dummy electrode toward a center of the multilayer body by about 50% or more.

2. The multilayer ceramic electronic component according to claim 1, wherein the dummy electrode is exposed at at least one of the first side surface and the second side surface, on a ceramic layer on which the first internal electrode layer is provided.

3. The multilayer ceramic electronic component according to claim 1, wherein the dummy electrode is exposed at at least one of the first end surface and the second end surface, on a ceramic layer on which the second internal electrode layer is provided.

4. The multilayer ceramic electronic component according to claim 3, wherein the second internal electrode layer includes a second opposing portion opposing the first internal electrode layer, a third extended portion extended to the first side surface from the second opposing portion, and a fourth extended portion extended to the second side surface from the second opposing portion; and a length, in the width direction of the multilayer body, of the dummy electrode exposed at the first side surface or the second side surface is about 50% to about 60% of a corresponding one of lengths, in the width direction of the multilayer body, of the third extended portion of the second internal electrode layer and the fourth extended portion of the second internal electrode layer.

5. The multilayer ceramic electronic component according to claim 4, wherein the second opposing portion has a rectangular, substantially rectangular, or tapered shape in a plan view.

6. The multilayer ceramic electronic component according to claim 1, wherein a thickness of the dummy electrode in the lamination direction is smaller than a corresponding one of thicknesses of the first internal electrode layer and the second internal electrode layer in the lamination direction.

7. The multilayer ceramic electronic component according to claim 1, wherein a thickness of the dummy electrode in the lamination direction is about 75% to about 95% of a corresponding one of thicknesses of the first internal electrode layer and the second internal electrode layer in the lamination direction.

8. The multilayer ceramic electronic component according to claim 1, wherein a center portion, in the length direction of the multilayer body, of the dummy electrode exposed at the first side surface or the second side surface is at a position within 3% from a center portion, in the length direction of the multilayer body, of the second internal electrode layer exposed at the first side surface or the second side surface.

9. The multilayer ceramic electronic component according to claim 1, wherein in the dummy electrode, a proportion of an area of a pore to an area of the region separated from the exposed portion of the dummy electrode toward the center of the multilayer body by about 50% or more is about 50% to about 80%.

10. The multilayer ceramic electronic component according to claim 1, wherein the first internal electrode layer includes a first opposing portion opposing the second internal electrode layer, a first extended portion extended to the first side surface from the first opposing portion, and a second extended portion extended to the second side surface from the first opposing portion.

11. The multilayer ceramic electronic component according to claim 10, wherein the first opposing portion has a rectangular or tapered shape in a plan view.

12. The multilayer ceramic electronic component according to claim 1, wherein the dummy electrode includes a plurality of dummy electrodes which have rectangular or substantially rectangular shapes and which are respectively spaced apart from the first internal electrode layer and the second internal electrode layer.

13. The multilayer ceramic electronic component according to claim 1, wherein the first outer electrode, the second outer electrode, the third outer electrode, and the fourth outer electrode each include an underlying electrode and a plated layer.

14. The multilayer ceramic electronic component according to claim 13, wherein the underlying electrode includes at least one of a baked layer, a conductive resin layer, and a thin film layer.

* * * * *